US008817900B2

(12) United States Patent
McGowan et al.

(10) Patent No.: US 8,817,900 B2
(45) Date of Patent: *Aug. 26, 2014

(54) FREQUENCY-DOMAIN PEAK POWER REDUCTION

(75) Inventors: Neil McGowan, Stittsville (CA); Marthinus Willem Da Silveira, Ottawa (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 128 days.

This patent is subject to a terminal disclaimer.

(21) Appl. No.: 13/443,398

(22) Filed: Apr. 10, 2012

(65) Prior Publication Data
US 2013/0266082 A1 Oct. 10, 2013

(51) Int. Cl.
*H04L 27/28* (2006.01)

(52) U.S. Cl.
USPC ........... 375/260; 375/295; 375/296; 375/297; 455/63.1; 455/69; 455/91; 455/114.3; 455/127.1; 455/522; 370/210; 370/344; 370/480; 341/173; 341/180; 330/149

(58) Field of Classification Search
USPC ........... 375/260, 295, 296, 297; 455/63.1, 69, 455/91, 114.3, 127.1, 522; 370/210, 344; 370/480; 330/149; 341/173, 180
See application file for complete search history.

(56) References Cited

U.S. PATENT DOCUMENTS

| 6,236,864 | B1 | 5/2001 | McGowan et al. |
| 6,687,511 | B2 | 2/2004 | McGowan et al. |
| 6,931,053 | B2 | 8/2005 | McGowan |
| 7,292,639 | B1 * | 11/2007 | Demirekler et al. .......... 375/260 |
| 7,542,517 | B2 * | 6/2009 | Kroeger .......................... 375/296 |
| 7,583,583 | B2 | 9/2009 | Guo et al. |
| 7,792,200 | B2 * | 9/2010 | Molander ...................... 375/260 |
| 7,817,733 | B2 * | 10/2010 | Carsello ......................... 375/260 |
| 2008/0002779 | A1 | 1/2008 | Carsello |
| 2009/0092195 | A1 | 4/2009 | Guo et al. |
| 2009/0176466 | A1 | 7/2009 | Hellberg et al. |
| 2009/0233557 | A1 * | 9/2009 | Wang et al. ................. 455/67.13 |
| 2013/0315320 | A1 * | 11/2013 | McGowan et al. ........... 375/260 |

FOREIGN PATENT DOCUMENTS

| WO | 2007/055653 A2 | 5/2007 |
| WO | 2010/138032 A1 | 12/2010 |

OTHER PUBLICATIONS

International Search Report and Written Opinion issued in corresponding International application No. PCT/IB2013/000642, date of mailing Oct. 2, 2013.

* cited by examiner

*Primary Examiner* — Leon Flores
(74) *Attorney, Agent, or Firm* — Patent Portfolio Builders PLLC

(57) ABSTRACT

A system and method are provided for frequency domain peak power reduction on a plurality of orthogonal frequency divisional multiplexing (OFDM) signals in a communications system, wherein frequency domain processing of at least one OFDM signal carrier is iteratively performed to reduce peak power transmissions. OFDM signal carriers can include both in-band sub-carrier signals, and guard-band sub-carrier signals. Each iteration of peak power reduction takes as an input the frequency domain representation of the signal from the previous iteration that has been altered with respect to an error signal also represented in the frequency domain, determines an error signal (in the frequency domain), and subtracts this from the input to produce a further peak power reduced frequency domain signal. If there are no peaks above the configured peak power reduction threshold, then the signal passes through the FPPR iterations with no change.

38 Claims, 12 Drawing Sheets

| CONFIGURATION | PAPR @ 1E-4 [dB] | PAPR @ 1E-5 [dB] | EVM [%] |
|---|---|---|---|
| BASELINE CASE:<br>10 MHz LTE<br>NO GUARD BAND SUBCARRIERS USED FOR PPR | 6.54 | 6.74 | 6.6%<br>(-23.6 dB) |
| 10 MHz LTE<br>24 GUARD BAND SUBCARRIERS (12 ON EACH SIDE) USED FOR PPR | 6.55 | 6.84 | 4.7%<br>(-26.6 dB) |

FIG. 6

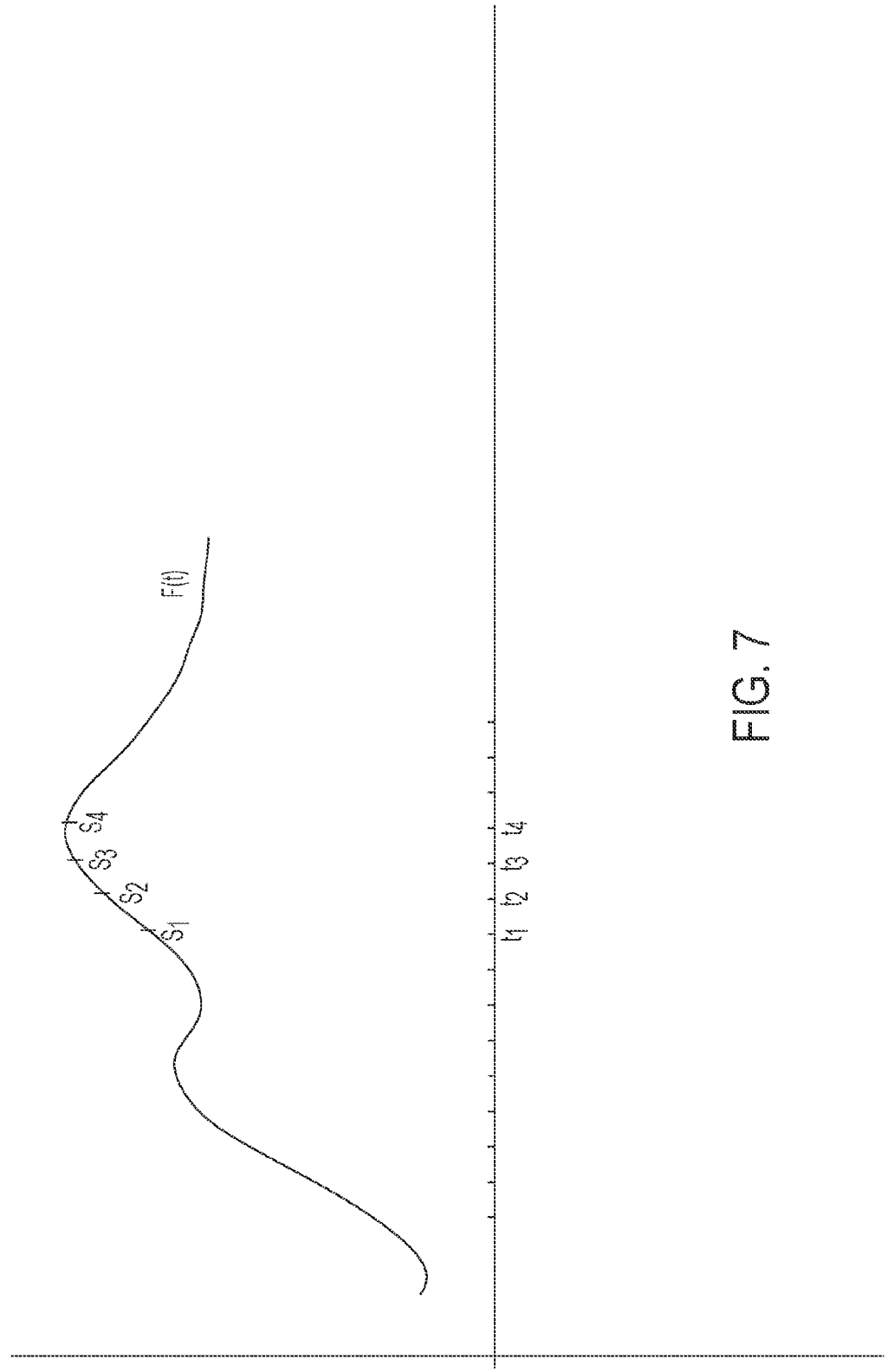

FREQUENCY-DOMAIN PEAK POWER REDUCTION

TECHNICAL FIELD

The present invention relates generally to the transmission of orthogonal frequency division multiplexing (OFDM) signals, and more particularly to the power-efficient transmission of such signals through a reduction in peak power in the frequency domain of the OFDM signals.

BACKGROUND

Complex radio signals can be used for digital audio communications, as is well known to those of ordinary skill in the art. For example, one common complex transmission scheme is orthogonal frequency-division multiplexing (OFDM), which can be used for terrestrial digital video broadcasting (DVB-T), digital audio broadcasting (DAB-T), wireless local area networks, and wireless metropolitan area networks. However, the well-known advantages of OFDM are somewhat counter-balanced by a significant side-effect: high peak-to-average power ratio. High peak-to-average power ratios of OFDM significantly reduces the average power at the output of the high-power amplifier (HPA) used at the transmitter. Relatively expensive HPA's are required because, as is true of many power amplifiers, the input signal must lie within the linear range of the power amplifier, and because there is an increased linear dynamic range, the power amplifiers require expensive components and more complicated designs to provide such dynamic range. Some solutions to this problem include digital reduction of the peak-to-average power ratios.

Digital reduction of the peak-to-average power ratio (PAPR) of a complex radio signal, while filtering the signal to remove out of band emissions, provides a way to reduce the peak demand on the power amplifier. Digital reduction of the PAPR enables improved efficiency and reduces the cost of a cellular radio system with a small, but acceptable degradation in signal quality or error vector magnitude (EVM). From here-on in, throughout this discussion, the term "peak power reduction" (PPR) shall be used in place of PAPR Reduction for convenience.

Orthogonal frequency division multiplexing (OFDM) technologies have complex radio signals with many closely spaced sub-carriers, each of which can have a very different EVM requirement. However, the close frequency spacing increases the difficulty in providing differentiation from an EVM perspective during PPR. In OFDM, it is known that there can be, for example up to 600 in-band sub-carriers and up to 60 guard band sub-carriers and 364 out of band sub-carriers, for a total of 1024 "sub-carriers" in each band, or "carrier". As those of ordinary skill in the art understand, each sub-carrier in an OFDM communications system is an integer multiple of a base sub-carrier frequency, which is what makes each sub-carrier orthogonal to each other, and hence non-interfering. Accordingly, a first sub-carrier in a first carrier band can have a frequency of 15 kHz.

With the use of OFDM technologies, the signal is composed of an array of sub-carriers of varying tolerance to degradation in signal quality. That is, different sub-carriers have different EVM requirements. Some of the existing time domain solutions are unable to make a distinction between the sub-carriers, and so time domain solutions are limited in the amount of PPR that can be applied to the least tolerant sub-carrier. In other cases, the existing solutions do not differentiate between traffic sub-carriers and required reserved tones (or reserved sub-carriers) that take away from the allocated spectrum for normal communication (See, for example, "Apparatuses and a Method for Reducing Peak Power in a Transmitter of Telecommunications Systems", U.S. Published Patent Application No. 2009/0176466 A1, published on Jul. 9, 2009, by Richard Hellberg, and Torbjorn Widhe, the entire contents of which are incorporated herein by reference; and "System and Method for Reducing Peak-to-Average Power Ratio in Orthogonal Frequency Division Multiplexing Signals Using Reserved Spectrum", U.S. Pat. No. 7,583,583, Issued Sep. 1, 2009, to Ning Guo, Neil McGowan, and Gary Boudreau, the entire contents of which are incorporated herein by reference). Other existing solutions differentiate between traffic sub-carriers, but still require reserved sub-carriers that take away from the allocated spectrum for normal communication (See, for example, "Method and System for Adaptive Peak-To-Average Power Ratio Reduction in Orthogonal Frequency Division Multiplexing Communication Networks", U.S. Published Patent Application No. 2009/0092195 A1, published on Apr. 9, 2009, by Ning Guo, Neil McGowan, and Bradley John Morris, the entire contents of which are incorporated herein by reference). Furthermore, all of these prior methods produce and pass between iterations a time domain representation of the signal. This is problematic for at least two reasons: first, there can be problems differentiating between sub-carriers; and second, a conversion must occur to the frequency domain and then back to the time domain.

Consequently, because of the problems associated with performing PPR through time domain solutions, as briefly discussed above, it would be desirable to provide methods, modes, and systems for performing peak power reduction using other than the time domain that will obviate or minimize the problems associated with prior art solutions. Performing PPR in the frequency domain provides the use of low-sample rates for multiple carriers in the frequency domain and the use of the guard band for PPR.

SUMMARY

It is therefore a general aspect of the invention to provide a frequency domain peak to average power reduction (FPPR) transmission system that will obviate or minimize problems of the type previously described.

According to a first exemplary aspect of the present invention, a peak power reduction method for peak power reduction on a plurality of orthogonal frequency divisional multiplexing (OFDM) signals in a communications system is provided comprising iteratively performing frequency domain processing of at least one OFDM signal carrier to reduce peak power transmissions. According to the first aspect, at least one OFDM signal carrier includes both in-band sub-carrier signals, and guard-band sub-carrier signals, and the step of iteratively performing the frequency domain processing comprises receiving in each new iterative step a frequency domain representation of the output signal from a previous iterative step. Still further according to the first aspect, each output signal from each iterative step is determined by subtracting an error signal determined for each iterative step, and wherein the error signal when subtracted is in the frequency domain.

According to the first aspect, the step of iteratively performing frequency domain processing comprises receiving each of the plurality of OFDM signals in a separate one of a plurality of carrier processing blocks, performing a first error path processing step in each of the separate carrier processing blocks, wherein a determinable phase slope is added to the received input OFDM signal in the frequency domain, converting the phase shifted frequency domain input signal to the time domain, wherein due to the added determinable phase slope the plurality of sampling points will be shifted by a first fractional time amount, combining a plurality of time shifted input signals in a total signal, comparing the power of the total signal to a first peak threshold amount at a respective one of each of the plurality of shifted sampling points, and generating a first error signal equivalent to the amount that the power of the time shifted input signal samples exceeds the first peak threshold amount, receiving the first error signal by a second error path processing step in each of the separate carrier processing blocks, and converting the received first error signal to a frequency domain error signal, applying respective weighting factors (36) to a first group of frequency components of the first error signal that corresponds to a respective carrier processing block frequency band, whereby excess peak power can be distributed to one or more guard-band sub-carriers of the OFDM signals, and/or one or more of the in-band sub-carriers of the OFDM signals, delaying each of the plurality of received input OFDM signals in the frequency domain, and subtracting the respective weighted carrier processing block frequency band from the delayed received input OFDM signal (6) to generate a first frequency domain peak power reduced input signal for each carrier processing block, that is then input to a next iteration processing stage of the respective carrier processing blocks, wherein in each of a subsequent one of the iteration stages of each of the plurality of carrier processing blocks, the determinable phase slope changes by a known amount, such that additional peak values of the respective received input OFDM signals can be determined.

According to the first aspect, the number of iteration stages is dependent upon the frequency band of the carrier processing block and the amount of determinable phase slope that is added in each subsequent first error path processing step. Still further according to the first aspect, an output of each of the respective carrier processing blocks is an output from the last iteration stage, and wherein the method further comprises summing all of the outputs of all of the respective carrier processor blocks into a combined transmission signal, converting the transmission signal into an analog signal, and transmitting a power amplified version of the transmission signal.

Still further according to the first aspect, the method further comprises, following conversion of the linear phase slope shifted frequency domain input signal into the time domain, wherein the sampling points have been shifted by a first time amount, up-converting the time domain signal by a determinable frequency amount in a numerically controlled oscillator, and following receiving of the error signal in the second error path processing step and prior to converting it to a frequency domain signal, down-converting the received error signal by the determinable frequency in a numerically controlled oscillator.

According to the first aspect, the method further comprises, following conversion of the linear phase slope shifted frequency domain input signal into the time domain by an inverse fast Fourier transform circuit with K time domain sampling points, and wherein each of the plurality of sampling points have been shifted by a first time amount, imposing a cyclic rate change of determinable value R in a cyclic rate change circuit (38), such that there are now R times K time domain sampling points, and following receiving of the error signal in the second error path processing step and prior to converting it to a frequency domain signal, performing a reverse cyclic rate change such that there are now K time domain sampling points.

Still further according to the first aspect, each of the plurality of received OFDM input signals is a combined input OFDM signal that includes a plurality of OFDM signals centered about a plurality of separate respective carrier frequencies, and further wherein the respective carrier frequencies are different from one another by a determinable delta carrier frequency, the method further comprises, following conversion of the linear phase slope shifted frequency domain input signal into the time domain, determining a time sampled magnitude of the combined input OFDM signal and the signal phase, and following receiving of the error signal in the second error path processing step and prior to converting it to a frequency domain signal, multiplying the received error signal by the signal phase.

According to the first aspect, the weighting factor is determined according to the equation of:

$$Wi = W_i = \frac{\sigma B_T w_i}{\sum_{i=0}^{K-1} B_{w_i}}$$

where $B_T$ is the total bandwidth; $B_{w_i}$ is the spectral density of each weight component $w_i$. $w_i$ is a weight value that controls the amount of clipped energy that will fall on the frequency component i, K is the size of a Fast Fourier Transform (FFT) process, and $\sigma$ is a re-growth factor, wherein the re-growth factor controls the overall distortion of the received error signal and is a function of the number of iterations.

According to the first aspect, the weighting factor is determined according to a tolerance for distortion for each sub-carrier signal, and wherein the tolerance for distortion is characterized by an error vector magnitude for each sub-carrier signal.

According to the first aspect, the method further comprises increasing a number of time domain samples in each of the received plurality of OFDM signals in a cyclic rate change circuit prior to combining the plurality of time shifted input signals, and decreasing a number of time domain samples in the received first error signal prior to application of the weighting factors. Still further according to the first aspect, the plurality of OFDM input signals includes a plurality of sets of OFDM signals, and wherein each of the plurality of sets are based on separate transmission frequencies, and the method further comprises obtaining a magnitude of each of the plurality of sets of OFDM input signals, wherein the magnitude of each of the plurality of sets of OFDM signals comprises a phasor with a maximum magnitude and a minimum magnitude, and wherein the phasors change between the maximum and minimum magnitudes at a frequency related to the respective transmission frequencies, and further wherein the magnitude of the plurality of sets of OFDM signals is determined prior to the step of time shifting, and obtaining a plurality of phase differences between each of the plurality of sets of OFDM signals, wherein respective phase differences are multiplied against the received error signal to recover the plurality of frequency differences between each of the plurality of sets of OFDM input signals.

According to the first aspect, the first error signal is determined according to the equation of:

$$E_n = \left[1 - \frac{\sqrt{T_{PPR}(n)}}{|C_{tot}|}\right] C_{tot}.$$

According to a second exemplary aspect of the present invention, a system for peak power reduction on a plurality of orthogonal frequency divisional multiplexing (OFDM) signal carriers in a communications system is provided comprising a plurality of carrier processing blocks configured to iteratively perform frequency domain processing of at least one OFDM signal carrier to reduce peak power transmissions, wherein the at least one OFDM signal carrier includes both in-band sub-carrier signals, and guard-band sub-carrier signals.

According to the second aspect, each of the plurality of carrier processing blocks comprises a plurality of iteration processing blocks, wherein a first iteration processing block is configured to receive a respective one of the plurality of frequency domain OFDM signal carriers, and generate a first time domain error path processing block magnitude signal, receive a first iterative time domain error signal, and output a first iterative frequency domain peak power reduced OFDM carrier signal, and wherein each of the remaining n−1 iteration processing blocks are configured to receive an $(n-1)^{th}$ iterative frequency domain peak power reduced OFDM carrier signal, output an $n^{th}$ time domain error path processing block magnitude signal, receive an $n^{th}$ iterative error signal, and generate an $n_{th}$ iterative frequency domain peak power reduced OFDM carrier signal.

According to the second aspect, the system further comprises a plurality of OFDM signal processing blocks, there being a respective one of the plurality of OFDM signal processing blocks for each of the respective plurality of carrier processing blocks, and wherein each of the plurality of OFDM signal processing blocks is configured to receive an nth iterative frequency domain peak power reduced OFDM carrier signal and output a time domain, filtered, peak power reduced OFDM carrier signal, a summer to add each of the plurality of time domain, filtered, peak power reduced OFDM carrier signals, and a high powered transmitter to transmit the summed time domain, filtered peak power reduced OFDM carrier signal following conversion from a digital time domain signal to an analog signal.

Still further according to the second aspect, each of the plurality of OFDM signal processing blocks comprises an equalizer configured to boost in amplitude sub-carrier guard band signals within the nth iterative frequency domain peak power reduced input signal, an inverse fast frequency transform circuit configured to convert the equalized nth iterative frequency domain peak power reduced input signal to an equalized nth iterative time domain peak power reduced input signal, and a filter configured to substantially reduce or eliminate unwanted frequency components from the equalized nth iterative time domain peak power reduced input signal to output time domain, filtered, peak power reduced OFDM signals. Still further according to the second aspect, the number of iteration stages is dependent upon the frequency band of the carrier processing block and the amount of determinable phase slope that is added in each subsequent first error path processing step.

According to the second aspect, each of the plurality of carrier processing blocks comprises a plurality of error path processing blocks, and wherein each of the plurality of error path processing blocks include a phase slope circuit configured to add a determinable phase slope to the received input OFDM signal carrier in the frequency domain, an inverse fast frequency transform circuit configured to convert the phase shifted frequency domain input OFDM signal carrier to the time domain, wherein due to the added determinable phase slope, a plurality of sampling points will be shifted by a first fractional time amount, and a first numerically controlled oscillator configured to shift the time domain received frequency domain OFDM signal carrier by a first predetermined frequency amount based on which of the plurality of carrier processing blocks the received input OFDM carrier signals are received in, and outputting an iterative time domain error path processing block magnitude signal.

Still further according to the second aspect, for each iteration of processing, the fractional time amount shift causes additional peak values of the iterative time domain error path processing block magnitude signal to be output by the error path processing block, and further wherein the system further comprises a combiner configured to combine a plurality of $n^{th}$ iterative time domain error path processing block magnitude signals to generate an nth iterative total combined magnitude signal $C_{tot}$, and a clip error circuit configured to compare the nth iterative total combined magnitude signal to a peak power threshold signal $T_{PPR}$ and generate an $n^{th}$ iterative error signal $E_n$ on a symbol-by-symbol basis, wherein the nth iterative error signal either has a zero value when the nth iterative total combined magnitude signal is less than the peak power threshold signal, and further wherein the nth iterative error signal has a non-zero value when the nth iterative total combined magnitude signal is greater than the peak power threshold signal.

According to the second aspect, the non-zero value of the nth iterative error signal is equal to the amount that the nth iterative total combined magnitude signal exceeds the peak power threshold signal, and the nth iterative error signal is determined according to the equation of:

$$E_n = \left[1 - \frac{\sqrt{T_{PPR}(n)}}{|C_{tot}|}\right] C_{tot}.$$

Still further according to the second aspect, the clip error circuit is further configured to, on an iterative basis, compare the nth iterative total combined magnitude signal to a first peak threshold amount at a respective one of each of the plurality of shifted sampling points to generate an nth iterative error signal, and wherein the error path processing block further comprises a second numerically controlled oscillator configured to receive the nth iterative error signal and shift it by a second predetermined frequency amount substantially equivalent to an inverse of the first predetermined frequency amount, a fast Fourier transform circuit configured to convert the frequency shifted nth iterative error signal to a frequency domain iterative error signal, a multiplier circuit configured to multiply the frequency domain iterative error signal by a plurality of weighting factors to generate an iterative weighted error signal, and an inverse phase slope circuit configured to subtract a second determinable phase slope substantially equal to in magnitude to the first determinable phase slope from the iterative weighted error signal.

According to the second aspect, the system further comprises a plurality of delay circuits, one for each of the plurality of carrier processing blocks, configured to receive a respective one of the plurality of OFDM signal carriers and delay it by a first delta time, and a plurality of multiplier circuits, one for each of the plurality of carrier processing blocks, configured to multiply the delayed OFDM signal carrier and the weighted iterative error signal to generate the nth iterative frequency domain peak power reduced OFDM carrier, whereby excess peak power can be distributed to one or more guard-band sub-carriers of the OFDM signal carrier, and/or one or more in-band sub-carriers of the OFDM signal carrier.

Still further according to the second aspect, the first delta time is substantially equivalent to a sum of the processing time in positive phase slope circuit, inverse fast Fourier transform circuit, first numerically controlled oscillator, combiner, clip error circuit, second numerically controlled oscillator, fast Fourier transform circuit, multiplier, and negative phase slope circuit. In accordance with the second aspect, the nth iterative frequency domain peak power reduced OFDM carrier is input to an (n+1)th error path processing block, and an n=Nth iterative frequency domain peak power reduction OFDM carrier is generated.

According to the second aspect, the system further comprises a plurality of OFDM carrier signal processing blocks, one for each of the carrier processing blocks, configured to process respective ones of the Nth iterative frequency domain peak power reduced OFDM carrier signals and generate time domain peak power reduced OFDM carrier signals, a summer to sum the plurality of time domain peak power reduced OFDM carrier signals into a combined digital transmission signal, converting the transmission signal into an analog signal, and transmitting a power amplified version of the transmission signal.

According to the second aspect, the system further comprises a cyclic rate change increase circuit after the inverse fast Fourier transform circuit and before first numerically controlled oscillator, wherein the cyclic rate change increase circuit comprises a pre-determined cyclic rate change value R and is configured to generate M time domain sampling points, wherein M equals R times K, wherein K corresponds to the number of sample points of the time domain received frequency domain OFDM signal carrier, and a cyclic rate change reduction circuit after the second numerically controlled oscillator circuit, and before the fast Fourier transform circuit, wherein the cyclic rate change reduction circuit comprises the pre-determined cyclic rate change value R and is configured to generate M divided by R time domain sampling points, such that there are again K time domain sample points to be processed by the fast Fourier transform circuit.

According to the second aspect, each of the plurality of received OFDM signal carriers is a combined input OFDM signal that includes a plurality of OFDM signals centered about a plurality of separate respective carrier frequencies, and further wherein the respective carrier frequencies are different from one another by a determinable delta carrier frequency, and wherein the system further comprises a magnitude determination circuit after the inverse fast Fourier transform circuit, wherein the magnitude determination circuit is configured to determine a time sampled magnitude of the combined input OFDM signal, a signal phase determination circuit after the inverse fast Fourier transform circuit, wherein the signal phase determination circuit is configured to determine a plurality of phase differences between the signals that comprise the combined input OFDM signal, and a multiplier circuit configured to multiply the received $n^{th}$ iterative error signal by the phase difference generated by the signal phase determination circuit prior to conversion by the fast Fourier transform circuit, and further wherein the first and second numerically controlled oscillators have been omitted.

Still further according to the second aspect, wherein the time sampled magnitude of the combined input OFDM signal comprises a phasor with a maximum magnitude and a minimum magnitude, and wherein the phasor changes between the maximum and minimum magnitudes at a frequency related to the respective transmission frequencies, and further wherein the plurality of phase differences are multiplied against the received $n^{th}$ iterative error signal to recover the plurality of frequency differences between each of the plurality of received OFDM signal carriers.

According to the second aspect, the weighting factor is determined according to the equation of:

$$Wi = W_i = \frac{\sigma B_T w_i}{\sum_{i=0}^{K-1} B_{w_i}}$$

where $B_T$ is the total bandwidth, $B_{w_i}$ is the spectral density of each weight component $w_i$. $w_i$ is a weight value that controls the amount of clipped energy that will fall on the frequency component i, K is the size of a Fast Fourier Transform (FFT) process, and $\sigma$ is a re-growth factor, wherein the re-growth factor controls the overall distortion of the received error signal and is a function of the number of iterations. Still further according to the second aspect, the weighting factor is determined according to a tolerance for distortion for each sub-carrier signal, and wherein the tolerance for distortion is characterized by an error vector magnitude for each sub-carrier signal.

BRIEF DESCRIPTION OF THE DRAWINGS

The above and other objects and features of the present general inventive concept will become apparent and more readily appreciated from the following description of the embodiments with reference to the following figures, wherein like reference numerals refer to like parts throughout the various figures unless otherwise specified, and wherein:

FIG. 6 is a table illustrating improvements to the error vector magnitude of carrier signals in an OFDM transmission scheme according to an exemplary embodiment;

FIG. 7 is an illustration of a signal in the time domain that shows the effect of changes in sample points resulting from adding a changeable amount of phase to the signal in the frequency domain according to an exemplary embodiment;

DETAILED DESCRIPTION

Figure 1:
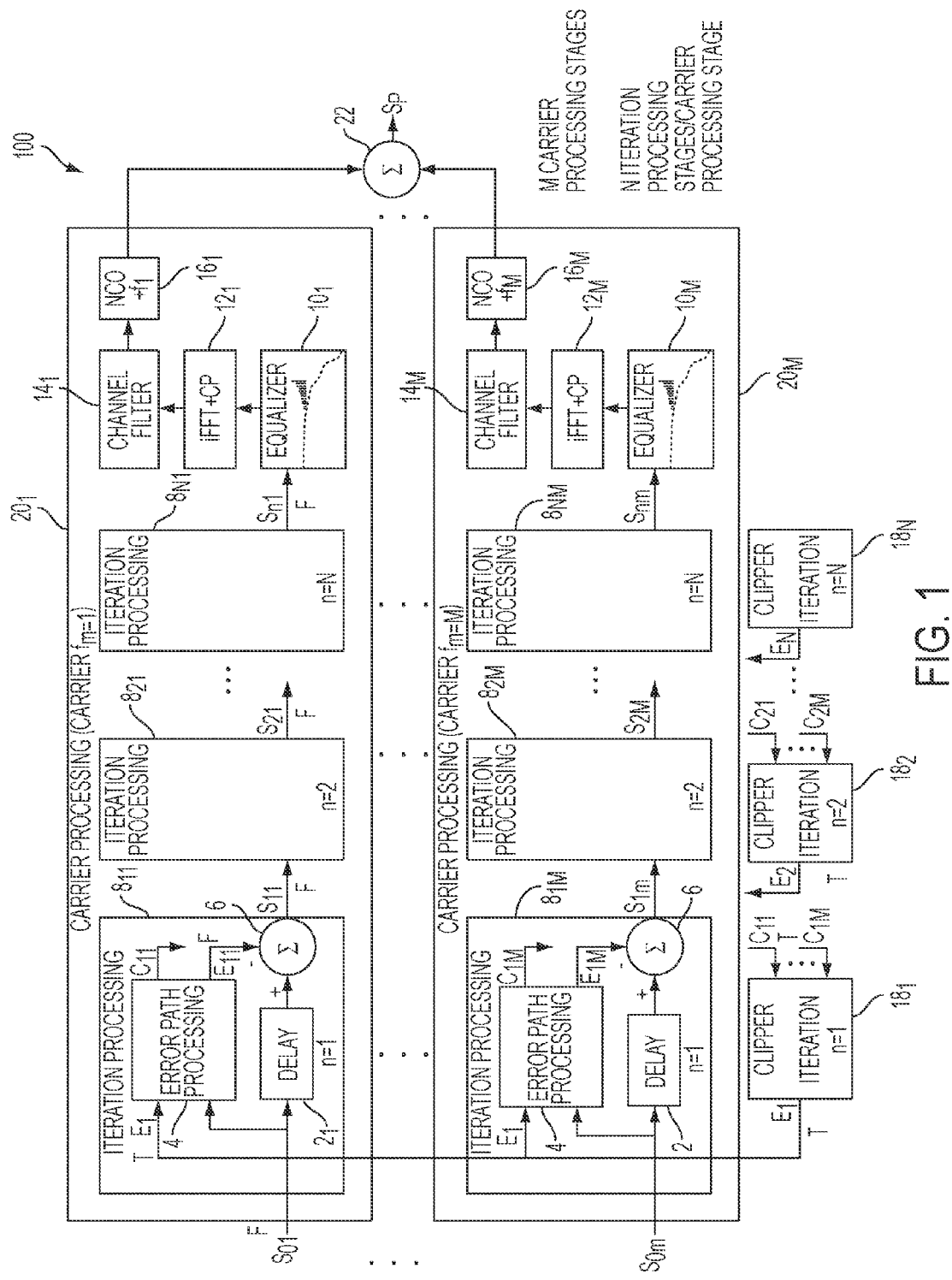
FIG. 1 is a high level block diagram of a frequency domain peak power reduction system according to an exemplary embodiment.

The inventive concept is described more fully hereinafter with reference to the accompanying drawings, in which embodiments of the inventive concept are shown. In the drawings, the size and relative sizes of layers and regions may be exaggerated for clarity. Like numbers refer to like elements throughout. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the invention is therefore defined by the appended claims. The following embodiments are discussed, for simplicity, with regard to the terminology and structure of a radio communication system using a power amplifier transmitter. However, the embodiments to be discussed next are not limited to these systems but may be applied to other wireless communication systems that are affected by the necessity to reduce the peak to average power transmissions.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Used throughout the specification are several acronyms, the meaning of which are provided as follows: orthogonal frequency division multiplexing (OFDM); error vector magnitude (EVM); peak-to-average power ratio (PAPR); peak power reduction (PPR); frequency-domain peak power reduction (FPPR); fast Fourier transforms (FFTs); inverse fast Fourier transforms (iFFTs); cyclic prefix (CP); finite impulse response (FIR); numerically controlled oscillator (NCO); long term evolution (LTE); peak-to-average power ratio (PAPR); Worldwide Interoperability for Microwave Access (WiMAX); quadrature phase shift keying (QPSK); 64 quadrature amplitude modulation (64-QAM); end users (EU); advanced wireless services (AWS) band; and personal communications services (PCS) band.

According to an exemplary embodiment, FPPR performs peak power reduction on signals such as OFDM that are typically initially formed and represented in the frequency domain. Each iteration of peak power reduction takes as an input the frequency domain representation of the signal from the previous iteration that has been altered with respect to an error signal also represented in the frequency domain (from the previous iteration), determines an error signal represented in the frequency domain, and subtracts this from the input to produce a further peak power reduced frequency domain signal.

According to a further exemplary embodiment, many, if not all of the operations are performed in an error path so that computational complexity can be minimized as the quantization noise and other distortions have no effect on the main signal. According to still a further exemplary embodiment, if there are no peaks above the configured peak power reduction threshold, then the signal passes through the FPPR iterations with no change. This saves power and processing capabilities.

As discussed in greater detail below, and according to a further exemplary embodiment, the error signal is weighted according to the tolerance for distortion (EVM) for each sub-carrier. That is, different sub-carriers will have different weights applied, depending on the modulating technology being used for the particular sub-carrier. According to an exemplary embodiment, some portion of the spectrum in the guard band can be used to improve FPPR performance.

According to a further exemplary embodiment, equalization can be performed on the spectrum in the guard band to improve FPPR performance and reduce filtering complexity. Equalization in accordance with the exemplary embodiments will emphasize, or boost, the sub-carriers found in the guard band region, thereby adding power to that portion of the spectrum that otherwise would have been reduced by the filter roll-off, thereby increasing PPR performance. Reducing filtering complexity minimizes design time and complexity. A normalization step is performed on the error signal weights to ensure that the targeted peak reduction is met while minimizing EVM impact.

Interpolation between samples can be useful to implement low sample rate processing, and ensures substantially all peaks are operated on. Interpolation back to the original samples is performed in the error path and in the frequency domain where it is less complicated to implement, than, for example, in the time domain. As a result, there are no extra fast Fourier transforms (FFTs) or inverse fast Fourier transforms (iFFTs) needed to perform this operation.

The emissions caused by the transition between symbols can be reduced by using windowing as part of the conversion to the time domain after the FPPR iterations and is done preferably in the area of the signal as defined by 3GPP that has no effect on EVM.

FIG. 1 is a high level block diagram of frequency domain peak power reduction (FPPR) system 100 according to an exemplary embodiment. According to exemplary embodiments, current systems that can employ FPPR system 100 (and its associated methods) include long term evolution equipment (LTE), LTE advanced, and Worldwide Interoperability for Microwave Access, or WiMAX. WiMAX is a communication technology for wirelessly delivering high-speed Internet service to large geographical areas, at rates up to 75 MBs for personal users, and 1 Gbit/s for fixed stations. WiMAX has been promoted as an alternative to cable and DSL.

The inputs to the FPPR system are M frequency domain baseband carrier signals, $S_{Om}$, where m=1 . . . M, m is the carrier index, and M is the number of carriers that are used in the transmission system. The peak power reduction processing of each carrier signal $S_{Om}$ is performed by carrier processing blocks $20_m$. Carrier processing block $20_1$ consists of N sequential iteration processing blocks $8_{n1}$, where n=1 . . . N, followed by equalizer 10, inverse fast Fourier transform (iFFT) block 12, which also includes a cyclic prefix (CP) insertion portion, windowing and channel filter block 14. According to an exemplary embodiment, channel filter block 14 can be, for example, a finite impulse response (FIR) filter, among other filter types. Carrier processing block $20_1$ further includes mixing stage (i.e., numerically controlled oscillator (NCO)) 16. "N", the number of iterations, can be related to, as discussed in greater detail below according to an exemplary embodiment, operation of linear phase slope block 24 (located in error path processing block 4), and the amount of sample shifting points that should be added in order to find the peaks. Each of the components of FPPR system 100 will now be described in greater detail.

Iteration Processing Block 8

Each iteration processing block $8_{nm}$ (according to an exemplary embodiment, there are N iteration processing blocks 8 per carrier processing block 20, and there are M carrier processing blocks 20), includes error path processing block 4, delay 2, and first adder 6. The first iteration processing block 8 of each carrier processing block 20 accepts as inputs sub-carrier signals $S_{Om}$ for that particular carrier pertaining to the carrier processing block 20, and the output $E_n$ of first clipper iteration block $18_n$. First iteration block $8_{11}$ outputs two signals according to an exemplary embodiment: first adder output signal $S_{11}$, and $C_{11}$, wherein signal $C_{11}$ is the output of error path processing block 4, and which is fed into first clipper iteration block $18_1$, as discussed in greater detail below. The frequency domain fed-forward carrier signal, $S_{11}$, which is also the first adder output signal $S_{11}$, is fed into the following iteration processing block $8_{21}$ (as briefly discussed above), along with the output of the second clipper iteration block $18_2$. Thus, each iteration processing block $8_{nm}$ accepts as inputs the previously processed fed-forward carrier signals $S_{(n-1)m}$, and the output of the clipper iteration block $18_n$, in order to modify the carrier signals $S_{(n-1)m}$, which are discussed in greater detail below.

Iteration processing block 8 is responsible for error path processing, which occurs within error path processing block 4, and adding a delayed version of the input signal to the negative of the error signal $E_{nm}$, and for generating the fed-forward frequency domain signal $S_{(n-1)m}$. The output of error path processing block 4 $E_{nm}$ is then subtracted from a delayed version of the signal input to the iteration processing block 8, $S_{(n-1)m}$, wherein according to an exemplary embodiment, the delay is equal to the error processing delay that occurs within error path processing block 4 and clipper iteration block 18.

Error Path Processing Block 4

Figure 2:
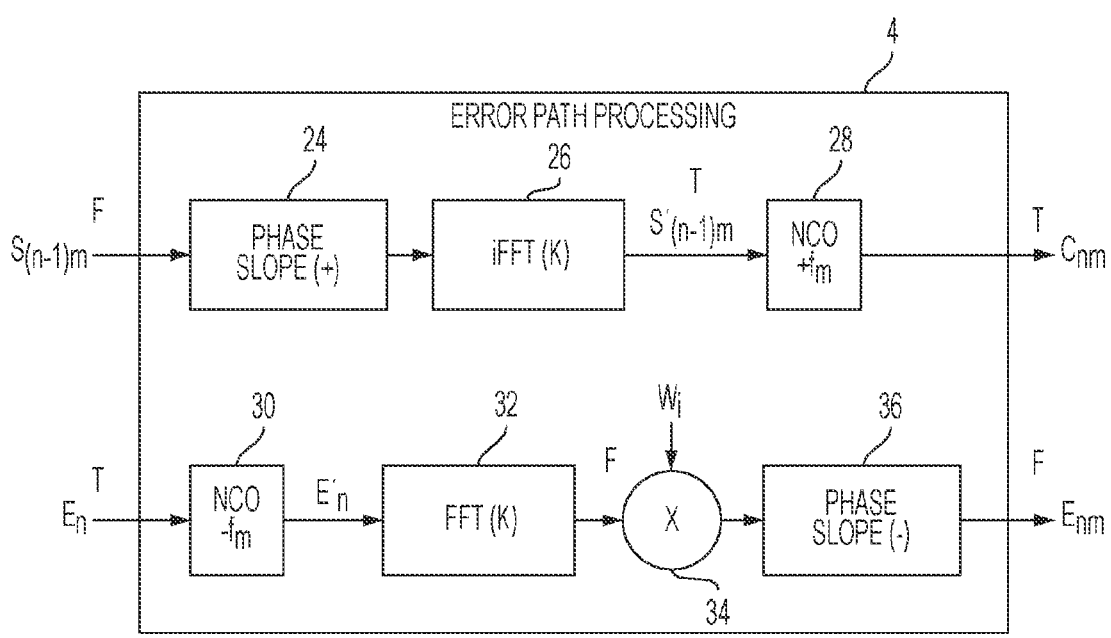
FIG. 2 is a detailed block diagram of a first embodiment an error path processing block shown in FIG. 1 according to an exemplary embodiment.

FIG. 2 is a detailed block diagram of a first embodiment of error path processing block 4 shown in FIG. 1 according to an exemplary embodiment. The inputs to each error path processing block 4 are signals $S_{(n-1)m}$, and $E_n$. Signal $E_n$ is the output of clipper iteration block 18, and is in the time domain. Signal $S_{(n-1)m}$, in the frequency domain, is the first of M carrier signals, in its original form, and is input to positive phase slope circuit 24. According to an exemplary embodiment, it is necessary to perform the equivalent of high rate sampling in order to capture all of the peaks of the frequency domain carrier signal $S_{(n-1)m}$, to know how much to reduce the input signal by in order to avoid attempting to transmit signals that exceed the capability of the power transmitter. The equivalent of a high rate of sampling is achieved by applying a linear phase slope to the input signal in the frequency domain so that a time shifted interpolated signal occurs in the time domain, meaning that the peaks between the original samples are "visible" to the clipper block 18.

The input to error path processing block 4 is the frequency domain carrier signal $S_{(n-1)m}$, and it is first input to positive phase slope circuit 24 as shown in FIG. 2. Positive phase slope circuit 24 adds a changeable amount of linear phase slope to the input signal. According to an exemplary embodiment, positive phase slope circuit 24 can be implemented as a negative phase slope circuit, with a corresponding positive phase slope circuit used in place of circuit 36, which is discussed in greater detail below. According to a further exemplary embodiment, the changeable amount of linear phase slope is iteration dependent, and this is discussed in greater detail below. When the changeable amount of linear phase slope is added to the input signal, and then the input signal is changed to the time domain (as which occurs in IFFT circuit 26, discussed in greater detail below), a fractional delay is added to the time domain signal. Several examples of fractional time delays for a time domain signal are shown in FIG. 7. Referring briefly to FIG. 7, the sampled signal, in the time domain, $f_{(t)}$, is sampled several times, at $s_1$, $s_2$, $s_3$, and $s_n$, and up to $s_N$, where n=1 . . . N, the number of iterations in each carrier processing block 20. There are n sampling points, but the first sample point is the sampling point with 0° of changeable amount of linear phase slope. Sample point $s_1$ is the original sampling point in time, and $s_2$ occurs because of a first changeable linear phase slope amount added to the input signal $f_{(t)}$, in the frequency domain, and the same applies to $s_3$ and $s_4$. Thus, it can be seen that by adding one or more changeable amounts of linear phase slope to the input signal it is possible to be at or near the peak, which can be used to determine how much of the signal to eliminate to avoid over driving the power transmitter.

According to an exemplary embodiment, as discussed above, the changeable amount of linear phase slope can be changed according to the iteration. For example, in the first carrier processing block $20_1$, there are N iterations of iteration processing block 8, and these process the first carrier, $S_{01}$. Thus, for a first iteration, iteration processing block $8_{11}$, the changeable linear phase slope amount could be 0°, as this is a good first position to determine whether a peak exists or not, then incremental phase changes are added. According to an exemplary embodiment, the phase slope is created by changing the phase φ of each sub-carrier (with sub-carrier index k) by:

$$\phi(k, n) = 2\pi\left(\frac{2k - K}{2}\right)\frac{\Delta(p(n))}{K} \qquad \text{Eq. 1}$$

where $$\Delta(p(n)) = \frac{p(n) - 1}{N} \qquad \text{Eq. 2}$$

and where the optimum choice of linear phase slope for each iteration n is determined by the order p(n)

$$p(n) \in \{0, 1, \ldots, N-1\}$$

For example with N=4, p(1)=0, p(2)=2, p(3)=1, p(4)=3. According to further exemplary embodiments, the number of iterations will be related to how many different time domain points are desired to be examined for peaks. The greater the number of iterations, the finer the resolution of time domain points. Of course, as those of ordinary skill in the art can appreciate, the greater the number of iterations, the more complex FPPR system 100 becomes in terms of implementation, and thus more expensive, and the longer time it takes to process the carrier signals prior to transmission. Thus, positive phase slope circuit 24 produces an interpolated fractional delay of the input signal in the time domain. According to a preferred exemplary embodiment, the fractional delay enables low sample rate peak power reduction, as it represents the peaks (at the fractional delay points) between the actual signal sampling points. According to still a further exemplary embodiment, it would be possible to add a fractional interpolation circuit after IFFT 26 (discussed below) and achieve the same effect as positive phase slope circuit 24.

$S_{(n-1)m}$, with a first changeable amount of phase, is then converted to the time domain signal $S'_{(n-1)m}$ by performing a K-point inverse fast Fourier transform (iFFT) in inverse fast Fourier transform (IFFT) block 26. The time domain signal, $S'_{(n-1)m}$, is then mixed in first numerically controlled oscillator (first NCO) circuit 28 to the carrier frequency $+f_m$ to produce the output signal $C_{nm}$. $C_{nm}$ is a time domain signal. First NCO circuit 28 performs a frequency shift such that the signal is translated to the correct relative center frequency compared to the other carriers before they are all added together. For each carrier, a different $f_m$ is applied to the input signal. If there was only one carrier signal, then according to further exemplary embodiments, there would not be a need for first NCO circuit 28, or the NCO frequency will be set to zero. By way of a non-limiting example, if there are 2 carriers, each with a bandwidth of 10 MHz, a first NCO circuit 28 could shift the first carrier to f1=+5 MHz, and a second NCO circuit could shift the other carrier to f2=−5 MHz, so that in the frequency domain, there are two 10 MHz signals adjacent to each other.

According to a further exemplary embodiment, the sample rate of $C_{nm}$ should be the same for all of the carriers. This can be accomplished by padding the input to iFFT block 26 with zeroes for the lower sample rate (lower bandwidth) carriers to the sample rate of the highest sample rate carrier. According to a further exemplary embodiment, the sample rate of $C_{nm}$ may even be below the Nyquist rate of the combined signal. In general, the lower the sample rate compared to the Nyquist rate of the combined signal, the larger the number of iterations required. A single carrier may be split into two or more smaller bandwidth carriers by splitting the frequency domain samples into sub-bands (each sub-band is then treated as a separate carrier) and reducing K and the sample rate. Multiple carriers may be combined into one larger bandwidth carrier by combining the frequency domain samples and increasing K and the sample rate.

Figure 5:
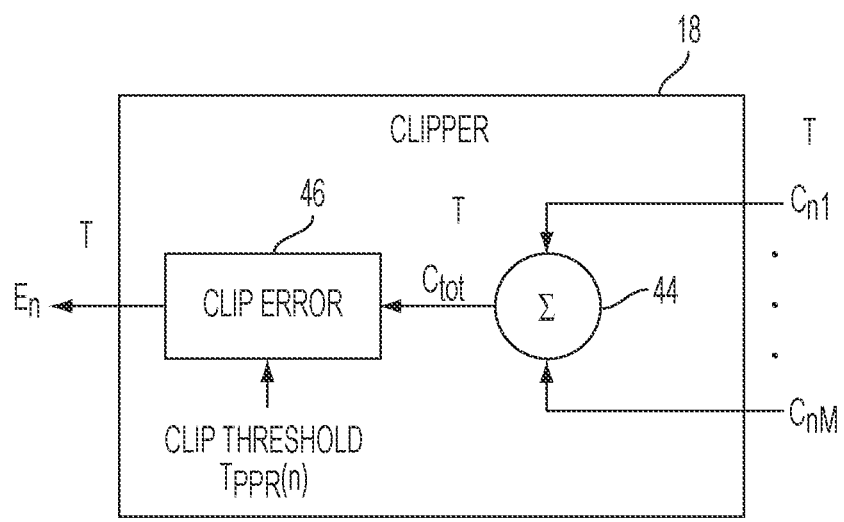
FIG. 5 is a detailed block diagram of an iteration clipper block shown in FIG. 1 according to an exemplary embodiment.

Although discussion all of the components of first error path processing block 4 has not been completed, focus will now be directed to clipper iteration block 18 shown in FIG. 5. Clipper iteration block 18 will be discussed in detail, and then discussion will return to first error path processing block and FIG. 2. Following that, discussion will be made of each of error path processing blocks 4' and 4".

Clipper Iteration Block 18

Regardless of which of several embodiments of the error path processing blocks 4, 4' or 4" are used, the M error path output signals, in the time domain, of each iteration n are then inserted into a respective clipper iteration block 18, which is shown in greater detail in FIG. 5. For example, if there were 10 carrier processing blocks 20, there would be ten inputs into each of clipper iteration block $18_1$, $18_2$, $18_3$, and so on, up to clipper iteration block $18_N$, where "N" is the number of iterations in each carrier processing block 20 (there being the same number of iterations per carrier processing block 20 according to an exemplary embodiment).

The input signals $C_{nm}$ to clipper iteration block 18, though in the time domain, are now correctly positioned in the frequency domain through the operation of NCO circuits 28. All of the outputs from the error path processing blocks 4, $C_{nm}$, are summed at summer 44 to produce the total signal $C_{tot}$. $C_{tot}$ is a time domain signal, and is compared to $T_{PPR(n)}$ in clipper error circuit 46. $T_{PPR(n)}$ is a power threshold amount for iteration stage n, and according to a further exemplary embodiment, can be the same or different for each of the different iterations n and can change per iteration stage n, for each carrier processing block 20, or can be the same for each iteration stage n in each carrier processing block 20. According to an exemplary embodiment, total signal $C_{tot}$ represents the peaks of the summed time domain signal that will be used to modify each input signal $S_{(n-1)m}$ to reduce the total PAPR. According to a further exemplary embodiment, an error signal $E_n$ is produced by clip error block 46 when the power per sample of $C_{tot}$ exceeds the peak power threshold. The error signal, $E_n$, represents the portion of the input signal ($C_{tot}$) that exceeds the predetermined peak power threshold $T_{PPR}(n)$, the output of clipper iteration block 18. Each $E_n$ signal is input to corresponding $n^{th}$ error path processing block $8_{nm}$ according to further exemplary embodiments. For example, as shown in FIG. 1, $E_1$ is input to each of error processing blocks $8_{11}$, $8_{12}$, through $8_{1N}$. However, if, by way of example only, $C_{tot}$ did not exceed $T_{PPR(n)}$, then $E_n$ would be 0. The error signal, $E_n$, is calculated in clip error block 46 by the following equation:

$$E_n = \left[1 - \frac{\sqrt{T_{PPR}(n)}}{|C_{tot}|}\right] C_{tot} \qquad \text{Eq. 3}$$

The error signal can be re-written as:

$$E_n = f(u)C_{tot} \qquad \text{Eq. 4}$$

where $$f(u) = \begin{cases} 0; & u \le 1 \\ 1 - \dfrac{1}{\sqrt{u}}; & u > 1 \end{cases} \qquad \text{Eq. 5}$$

and, $$u = \frac{|C_{tot}|^2}{T_{PPR}(n)} = \frac{1}{T_{PPR}(n)} |C_{tot}|^2 \qquad \text{Eq. 6}$$

The combined clipped error signal is now passed to the iteration processing blocks 4, 4' and 4" (shown in FIG. 1) as the case may be, of all the carriers where filtering will be applied.

Referring back to FIG. 2, and error path processing block 4, $E_n$, the error output signal from clipper block 18, is input into second NCO 30. Second NCO 30 will shift the error signal $E_n$ by $-f_m$, to product $E'_n$. Recall that it was discussed above that first NCO 28 translated the time domain signal $S'_{(n-1)m}$ by a frequency of $+f_m$, so now the error signal $E_n$, which is in effect related to all of the $C_{nm}$ signals output from first NCO 28, now has to be translated by the same frequency $-f_m$. Each component of the error signal $E_n$ will be translated by $-f_m$ to its proper center frequency, and the output of second NCO 30 is $E'_n$. Each carrier processing block 20 has its own particular $f_m$.

The error signal $E'_n$ is then converted with a K-point FFT, in FFT block 32, to the frequency domain. Note that in several of the figures, there are the designation of "T" and "F" at several locations: these indicate whether the signal is in the time domain (T) or frequency domain (F). The time domain error signal $E'_n$ is separated into its separate frequency domain individual sub-carriers by FFT block 32. A normalized weight value $W_i$ is applied to each frequency component i in multiplier 34, where:

$$W_i = \frac{\sigma B_T w_i}{\sum_{i=0}^{K-1} B_{w_i}} \qquad \text{Eq. 7}$$

with $B_T$ being the total signal bandwidth and B is the spectral density of each weight component $w_i$. Total signal bandwidth includes the bandwidth from the edges of the outside carriers including the guard bands in between the carriers. FIG. 10 illustrates the total signal bandwidth for two carriers. Except for the case in which the clipped energy is allowed in the guard band regions, the weight value of the sub-carriers $w_i$ in the guard band will be equal to zero.

$w_i$ is a weight value that controls the amount of clipped energy that will fall on the frequency component i, K is the size of the FFT, and σ is the re-growth factor. According to a first embodiment, re-growth factor σ is typically between about 0.3 and about 1.0. According to a preferred exemplary embodiment, the re-growth factor σ is between 0.3 and 1.0

The re-growth factor controls the overall distortion of the signal and is a function of the number of iterations. The purpose of multiplying the weighting factor, against the frequency domain representation of $E'_n$, which is the error signal in the frequency domain, it to (a) isolate or eliminate that frequency components that do not correspond or pertain to the frequency band of the specific carrier processing block 20, and (b) to control the amount of error signal that will then be removed from the original carrier input signal, $S_{(n-1)m}$. The net result is that different sub-carriers are set to zero, some are strengthened, and some are attenuated.

According to an exemplary embodiment, in a typical OFDM carrier scheme, wherein there are 600 different 15 kHz sub-carrier components (as well as 60 guard band sub-carriers and 364 out-of-band sub-carriers) for a bandwidth of 10 MHz (although, as one of ordinary skill in the art can appreciate, the 10 MHz bandwidth is but one of a plurality of exemplary bandwidths, and as such is a non-limiting example), each will get a weighting factor that is particularly tailored to the modulation and coding scheme that the sub-carrier employs. According to a further exemplary embodiment, each sub-carrier can have its own weighting factor, or an individual weighting factor can be applied to a plurality of sub-carriers and so on. According to still a further exemplary embodiment, the guard band carriers can be given weighting factors $W_i$ such that no excess "clipped" energy is absorbed by the guard carriers; in this latter case, if there is any excess "clipped" energy, it can be absorbed by one or more sub-carriers that pertain to different noise-tolerant modulation schemes, as more fully described below.

For example, according to an exemplary embodiment, quadrature phase shift keying (QPSK) can be used for end users (EU) that are experiencing a significant amount of noise—that is, they are operating in a poor radio environment. As can be appreciated by those of ordinary skill in the art, QPSK modulation is fairly tolerant of noisy environments, and therefore $W_i$ will be higher (though not greater than 1, as a 1 indicates a maximum amount of energy), meaning that more of the clipping energy will fall on that component versus that of some other components of the sub-carriers.

According to a further exemplary embodiment, a modulation/coding scheme that has a very high signal-to-noise ratio (SNR), and which can be used in an environment that is not receiving very much noise is for example 64 quadrature amplitude modulation (64-QAM). As those of ordinary skill in the art can appreciate, 64-QAM modulation schemes convey significant amounts of information very effectively and efficiently, but need relatively noise-less or noise-free environments due to the closeness in amplitude and phase between different symbols. According to an exemplary embodiment, a lower weighting factor $w_i$, is used for these types of signals to reduce the clipped energy, in order to provide a cleaner, that is relative noise free, version of the sub-carriers.

According to an exemplary embodiment, it is possible that all or some of the guard band sub-carriers can have weight values $w_i$ of 1, as discussed above. These guard band sub-carriers do not take any spectrum away from the in-band sub-carriers and therefore do not result in any impact to the capacity of the carrier (i.e., these are not reserved tones or reserved sub-carriers). Thus, a weighting factor of $w_i=1$, when applied to the guard-band sub-carriers, means that the guard-band sub-carrier receive excess clipped energy that would otherwise be attenuated, or discarded, thereby reducing the efficiency of the transmissions, and are allowed to be output from its respective iteration processing block 8.

Following the factoring in of the weighting factor $W_i$ in multiplier circuit 34, the now weighted error signal, in the frequency domain, is input to negative phase slope circuit 36, which applies an opposite amount of phase shift to the frequency domain weighted error signal. This, of course, means that a proportionate amount of time shifting occurs when translated back to the time domain (in, for example, at IFFT circuit 12), essentially putting the signal, whether it be in the time or frequency domain, at the same sample point that it was before entering iteration path processing block $\mathbf{8}_{nm}$. The output of negative phase slope circuit 36, $E_{nm}$, is also the output of error path processing block 4, which is then input to adder circuit 6. $E_{nm}$ is subtracted from a delayed version of the input signal $S_{(n-1)m}$ (the delay being substantially equal to the processing delay of error path processing block 4 and clipper iteration block $\mathbf{18}_n$), so that the error signal $E_{nm}$ is aligned with the input signal, and the resultant output of iteration processing block $\mathbf{8}_{nm}$, $S_{nm}$, is the frequency domain input signal to the next iteration processing block $\mathbf{8}_{(n+1)m}$, and so on, until all N stages of iteration are accomplished for each carrier processing block $\mathbf{20}_m$ (one for each carrier signal).

Figure 3:
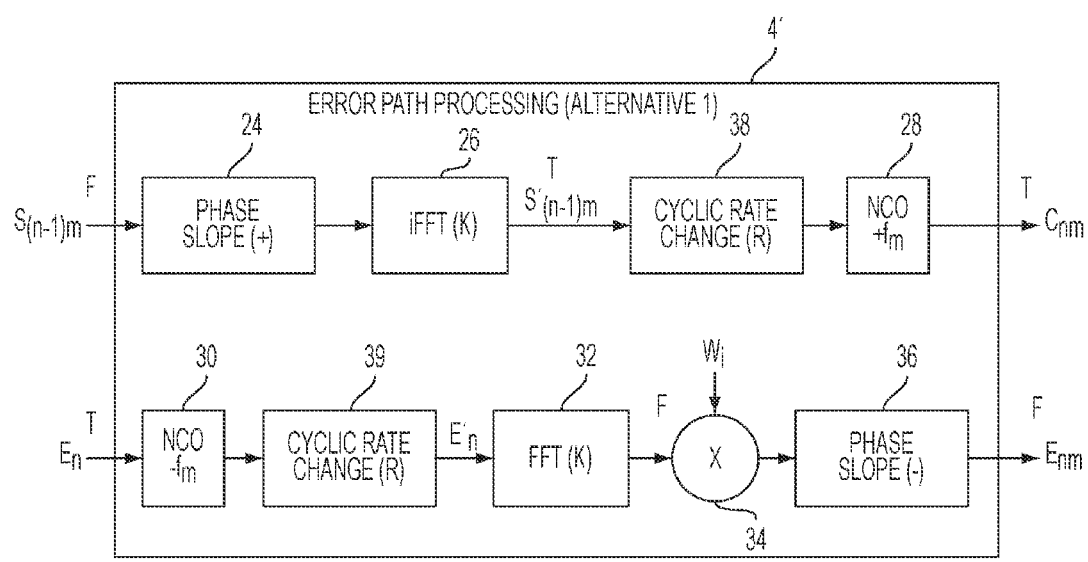
FIG. 3 is a detailed block diagram of a second embodiment of the error path processing block that can be used in place of the first error path processing block as shown in FIG. 1 according to an exemplary embodiment.

As discussed briefly above, there are several alternative embodiments for the error path processing. Attention is directed to FIG. 3, and error path processing block 4'. For the dual purposes of clarity and brevity, components of the alternative embodiments of error path processing blocks 4' and 4" that are substantially similar to those in first error path processing block 4 will not be described in detail.

FIG. 3 is a detailed block diagram of second error processing block 4' that can be used in place of error processing block 4 as shown in FIG. 1 according to a first alternative exemplary embodiment. According to an exemplary embodiment, the first alternative embodiment of error processing block 4' requires fewer iteration processing stages as compared to the embodiment of FIG. 2, but processes more samples per stage (with a proportionally larger hardware cost per stage). The increased number of samples may be produced, according to an exemplary embodiment, by using a larger value for K in IFFT block 26, or through the use of a cyclic rate change (CRC) increase block 38 with rate R, or a combination of the two (K and R), as shown in FIG. 3.

In error path processing block 4', shown in FIG. 3, a cyclic rate change (CRC) increase (circuit 38 has been inserted after the IFFT circuit 28, and accepts the time domain signal $S'_{(n-1)m}$ as an input. CRC increase circuit 38 increases the number of time domain samples by some factor R, for example 2. Through use of CRC increase circuit 38, the K number of time domain components created by IFFT circuit 28 is increased by the factor R, to 2K, or 4K, by way of non-limiting example only. If, for example, there are K frequency domain components, but it is desired that there be 2K, or even 4K time domain components, then R, the cycle rate "multiplier" is set to the appropriate factor, and the result is there is an equivalent increased amount of sampling of the signal in the time domain. This means that less frequency shifts needed to be performed by the positive phase slope circuit 24 in order to find all of the peaks between the original sample points. As discussed above, positive phase slope circuit 24 adds a certain changeable amount of phase increment to each component of the frequency domain signal, which is equivalent to adding a fractional time shift to the time domain signal. If the sampling points do not change, then the now fractional time shifted time domain signal will show the interpolated peaks to the clipper block 18, as discussed above. But, by now adding more time domain sample points with CRC increase circuit 38, even less phase change increments need to be made because more points will be checked for peak values by the clipper block 38 that might have been overlooked. According to an exemplary embodiment, fewer iterations will be needed as a result because, as discussed above, the clipper in each iteration processing stage will have more "visibility" of the actual peaks between the original sample points. The reduction in iteration processing stages can reduce the latency of the FPPR processing. However, each processing iteration stage will handle a larger number of samples and those of ordinary skill in the art can appreciate, use of CRC increase circuit 38 increases the complexity and costs of FPPR system 100.

After the time domain signal $C_{nm}$ is sent to clipper iteration block 18, and the time domain error signal $E_n$ is returned, CRC reduction block 39 takes the time domain signal back down to the original sample rate corresponding to the original number of frequency domain points.

The signal $E_n$ is mixed with frequency $f_m$ in NCO 30 to bring it back down to a baseband level, and a rate reduction R is performed in CRC reduction block 39 to produce the time domain signal $E'_n$. The rate reduction R, in CRC reduction block 39, is equal to the rate increase applied to signal $S'_{(n-1)m}$ in CRC increase circuit 38 so that the sample rate of signals $S'_{(n-1)m}$ and $E'_n$ are the same. The signal $E'_n$ is then converted with a K-point FFT, in FFT block 32, to the frequency domain, and the remainder of the signal processing that occurs with second error path processing block 4' is substantially similar to that of first error path processing block 4, and so shall not be discussed, for the dual purposes of clarity and brevity.

Figure 4:
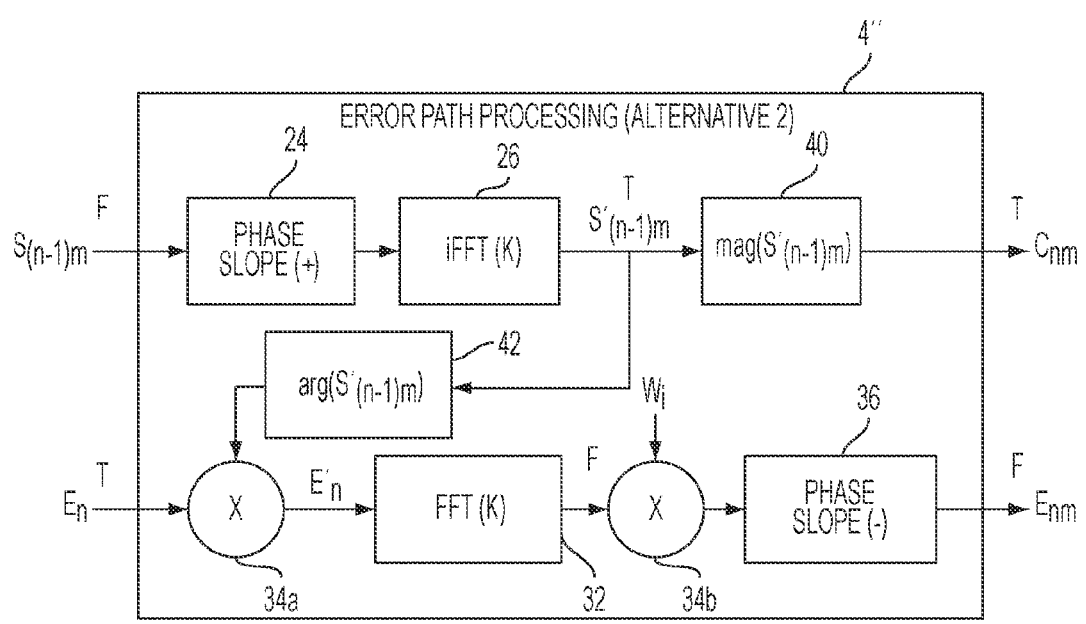
FIG. 4 is a detailed block diagram of a third embodiment of the error path processing block that can be used in place of either the first or second error processing blocks according to an exemplary embodiment.

Attention is directed towards FIG. 4, which is a second alternative embodiment of error path processing block 4" according to an exemplary embodiment. Functionally, the purpose of third error path processing block 4" is substantially similar to that of first and second error path processing blocks 4 and 4'. According to an exemplary embodiment, the second alternative embodiment of error processing block 4" also requires fewer iteration stages as compared to the embodiment of FIG. 2, with the added feature of not needing to process more samples per stage, but at the expense of some reduction in peak power reduction performance. According to a further exemplary embodiment, the second alternate embodiment of error path processing block 4" is useful for the case where there may be a large frequency separation between carriers.

Referring now to FIG. 4, third error path processing block 4" according to an exemplary embodiment is shown. Third error path processing block 4" is useful for special broadcasting circumstances. For example, it is sometimes desired to have one radio system service multiple bands. Such a system might be used, for example, to transmit an advanced wireless services (AWS) band (uplink of 1710 to 1755 MHz, and downlink of 2110 to 2155 MHz) and a personal communications services (PCS) band (uplink of 1850 to 1910 MHz, and downlink of 1930 to 1990 MHz), or two other different bands. By way of non-limiting example only, suppose the first band is centered at 2.0 GHz, and the second band is centered at 2.5 GHz, and each band has a 10 MHz LTE OFDM signal centered on the center frequency. The two information carrying signals, therefore, are spread about 500 MHz apart. It is a very difficult to have one transmitter, from an amplifier and antenna stand point, to transmit both signals at their proper center frequency without significantly sacrificing signal fidelity at one or the other, or both bands. It is known in conventional systems, however, that LTE signals that are within 40-80 MHz of each other can usually be easily transmitted by one transmitter and antenna. In the widely separated multi-band case, however, radio communications system operators generally would prefer to avoid multiple radios, for cost and maintenance reasons especially.

If, however, the two signals are represented by phasors, then the second signal, when viewed in regard to the first, will appear to be rotating at a frequency of about 500 MHz. Thus, the second signal will go in and out of phase with respect to the first signal very rapidly, adding and subtracting from the first signal very quickly. Therefore, a system that wants to transmit the two widely separated (in the frequency domain) signals can combine and sample the signals at a frequency that corresponds to one of the two signals, and the second signal will appear to experience a very quick phase/amplitude change with respect to the first signal. The magnitude of the signals are taken and added together, and then the peak values can be easily determined. In second error path processing block 4", the time domain signal, $S'_{(n-1)m}$ is sampled in magnitude determinator circuit 40, and the output is a magnitude signal, $C_{nm}$ that represents the magnitude of each of the two signals that are very far apart in frequency. All of the $C_{nm}$ signals are added together from the different carrier processing blocks 20, and a combined magnitude of all of the $C_{nm}$ signals are compared to the clipping threshold (in clipper iteration block 18). The output of the clip error circuit, $E_n$, represents the amount of energy that will be used to reduce the input signal, and is a worst case error signal for the two input signals. When $E_n$ is received by error path processing block 4", it is mixed with the output of argument determination circuit 42, the output of which is a signal that represents phase of signal $S'_{(n-1)m}$, and so restores the phase to the error signal $E_n$, in the time domain, to produce $E'_n$. $E'_n$ is then sent to FFT circuit 32, which converts $E'_n$ from a time domain signal to a frequency domain signal, and thereafter the different frequency components are weighted as discussed above in multiplier circuit 34b, and sent to negative phase slope circuit 36, as discussed in greater detail above.

According to an example embodiment, a total of N iteration processing stages are applied to each of the carriers in the M different carrier processing blocks 20, followed by equalizer 10. Equalizer 10 assists with peak power reduction by emphasizing different portions of the band of the error signal to compensate for the roll-off that occurs in channel filter 14 that follows. According to exemplary embodiments, the guard band sub-carriers are located in the transition region in the frequency domain of channel filter 14 that is used to contain the spectrum that is located before the digital-to-analog converter, just prior to being input to the power amplifier in the transmitter. It is necessary to filter the signal to handle out-of-band spectrum caused by the quantized noise and OFDM symbol boundaries when formulating the time domain signal for OFDM technology.

According to an exemplary embodiment, in order for peak power reduction to work properly, the net frequency response of the transmit chain up to the power amplifier should be substantially flat. Therefore, equalizer 10 changes the amplitude of the portion of the spectrum where the guard bands are located when the channel filter response in the guard bands are not flat, because the signal out of the last iteration process block contains energy in the guard band area. That is, the gain of the equalizer is zeros in the main signal band, and the inverse of channel filter 14 roll-off in the guard band. According to a further exemplary embodiment, when viewed in its entirety, the transfer function of the error signal of the entire carrier processing block 20 should be substantially flat, i.e. it should exhibit substantially little or no change in amplitude as a function of frequency.

In order to achieve the flatness in the error signal for each carrier processing block 20, a pre-emphasis is added to that portion of the carrier that contains the guard band frequencies where clipped energy are allowed that will later be reduced by the roll-off filtering effects discussed above. The frequency components in the guard band area where the clipped energy is allowed to fall are therefore multiplied by scaling factors that is the inverse of the channel filter roll-off.

For example, in a 10 MHz OFDM LTE communications systems, there are 600 in-band signal frequency domain sub-carrier components. Twelve additional guard band sub-carriers can be used according to an exemplary embodiment for PPR at each end of the in-band signal spectrum, for a total of 24 guard band sub-carriers. The guard bands are normally not used for data transmissions. Usually, therefore, these will have a 0 weight applied to them in the frequency domain filtering. But, if those weights are set to 1, then the clipped energy can go to those frequency components, and it will be substantially prevented from entering into the signal area. According to exemplary embodiments, 12 sub-carriers on each end of an OFDM LTE signal equals about 0.18 MHz of signal bandwidth at each end, and this can be used and still meet all emission requirements with an appropriate channel filter. In an example it was shown that approximately 4% of the spectrum is in the guard band can be used for significant PPR while meeting the required emission mask and significantly reducing the signal EVM impact of PPR.

The frequency domain signal output of the last stage is $S_{nm}$. The number of N iteration processing stages is related to the targeted peak to average ratio, EVM, as well as interpolation factors described above. The purpose of equalizer 10 is to compensate the guard band sub-carrier error signal for the roll-off effect of subsequent filtering. The requirements of the subsequent filtering are more stringent due to the energy in the guard band sub-carriers, which will require a steep roll-off that will be compensated in the error-signal processing by the pre-emphasis of the equalizer The equalized frequency domain signal $S_{nm}$ is converted to the time domain with standard processing, including iFFT and cyclic prefix (CP) addition performed in iFFT block 12. The signal from iFFT block 12 is then windowed and channel filtered (by, for example, a finite impulse response (FIR) filter) in channel filter block 14 to meet the required emission mask. The output from the window and channel filter block 14 of each carrier is then mixed with frequency $f_m$ and all carriers are added together in carrier adder 22 to form the final combined peak to average power reduced signal $S_p$, which is again in the time domain.

FIG. 6 is a table illustrating improvements to the error vector magnitude of sub-carrier signals in an OFDM transmission scheme according to an exemplary embodiment. According to an exemplary embodiment, with frequency domain peak power reduction (FPPR) some of the clip energy can now be allocated to the guard band. The table in FIG. 6 illustrates data for a 10 MHz long term evolution (LTE) cellular system. In the first line of data, the baseline case, no guard band sub-carriers were used for peak power reduction. In this case, the peak-to-average power ratio (PAPR) in dB is given at $10^{-4}$ and $10^{-5}$ probabilities, and the EVM for the baseline case is 6.6%. In the second example, wherein 24 guard band sub-carriers were used to help reduce peak power, the EVM improved to 4.7%, i.e., the EVM became noticeably smaller. According to further exemplary embodiment, all pass-band sub-carriers are assumed to have the same EVM requirement.

Referring now to FIGS. 8A-8D, there is shown a flow diagram of method 900 for implementing a frequency domain peak power reduction system according to an exemplary embodiment. Method 900, as discussed below, could be shown with several steps that indicate a "looping" function, or operation of an iterative procedure. Since those of ordinary skill in the art can appreciate that all of the functions discussed above could literally be performed in one digital signal processing device, such "looping" functions are necessary in order to achieve all of the iterations of error path processing as discussed. However, it is also possible, according to an exemplary embodiment, that each of the functional blocks as shown in the FIGS, and as discussed above, can be a separate physical entity, and as such iterative, looping steps that could have been written into method 900 do not actually exists as in steps of a software routine, but merely indicate that a next set of circuitry performs substantially similar operations as an immediately preceding set of circuitry.

Method 900 according to an exemplary embodiment begins with step 904, wherein a plurality of OFDM carrier signals are received in a frequency domain representation in a plurality of carrier processing blocks 20, there being preferably a one-to-one relationship between a carrier processing block 20 and carrier signals, $S_{0m}$. As those of ordinary skill in the art can appreciate, for each carrier processing block 20, there is a group of sub-carrier signals, commonly referred to as being part of, or associated with a "carrier." The received signal in each carrier processing block $20_m$ is initially received in error path processing block $8_{nm}$. According to a preferred exemplary embodiment of FPPR system 100 in a communications systems that uses OFDM type signals, there can be one carrier processing block 20 for each carrier, m such carriers, and each carrier can include up to 600 data-carrying sub-carriers, up to 60 sub-carrier guard bands, and 364 out-of-band sub-carriers. Each carrier processing block 20 includes, preferably, N equal iterative processing stages, wherein each iterative processing stage includes an iteration processing block 8, and clipper block 18.

Following step 904, in step 906, an $n^{th}$ Δ phase slope amount is added to the input signal in the $n^{th}$ iterative error path processing block. As discussed above, each iteration of processing that occurs in each iterative processing block 8 adds another Δ amount of phase slope which has the effect of shifting the received input signal in time, so that the peaks between the original sample points are available, thereby increasing the effectiveness of FPPR system 100. As previously discussed, there are N iterative stages, such that n=1 ... N. In step 908, the received frequency domain signal, with the added phase slope, is converted to a time domain signal, and in step 910, the time domain signal is shifted in frequency by first NCO 28.

According to a further exemplary embodiment, second error path processing block 4', as shown in FIG. 3, incorporates cyclic rate change circuit 38. Therefore, operation of CRC increase circuit 38 manifests itself in method 900 as an interim step, following conversion of the received frequency domain signals to time domain signals, and entails the process of increasing the number of time domain samples by some factor R, for example 2. Through use of CRC increase circuit 38, the K number of time domain components created by IFFT circuit 28 is increased by the factor R, to 2K, or 4K, by way of non-limiting example only. If, for example, there are K frequency domain components, but it is desired that there be 2K, or even 4K time domain components, then R, the cycle rate "multiplier" is set to the appropriate factor, and the result is there is an equivalent increased amount of sampling of the signal in the time domain. This means that less frequency shifts needed to be performed by the positive phase slope circuit 24 in order to find all of the peaks between the original sample points. An opposite action occurs in CRC decrease circuit 39, and thus following step 924, discussed below, an interim step would be added to decrease the number of time domain samples to their original amount, by the same factor as applied in CRC increase circuit 38.

Figure 8A:
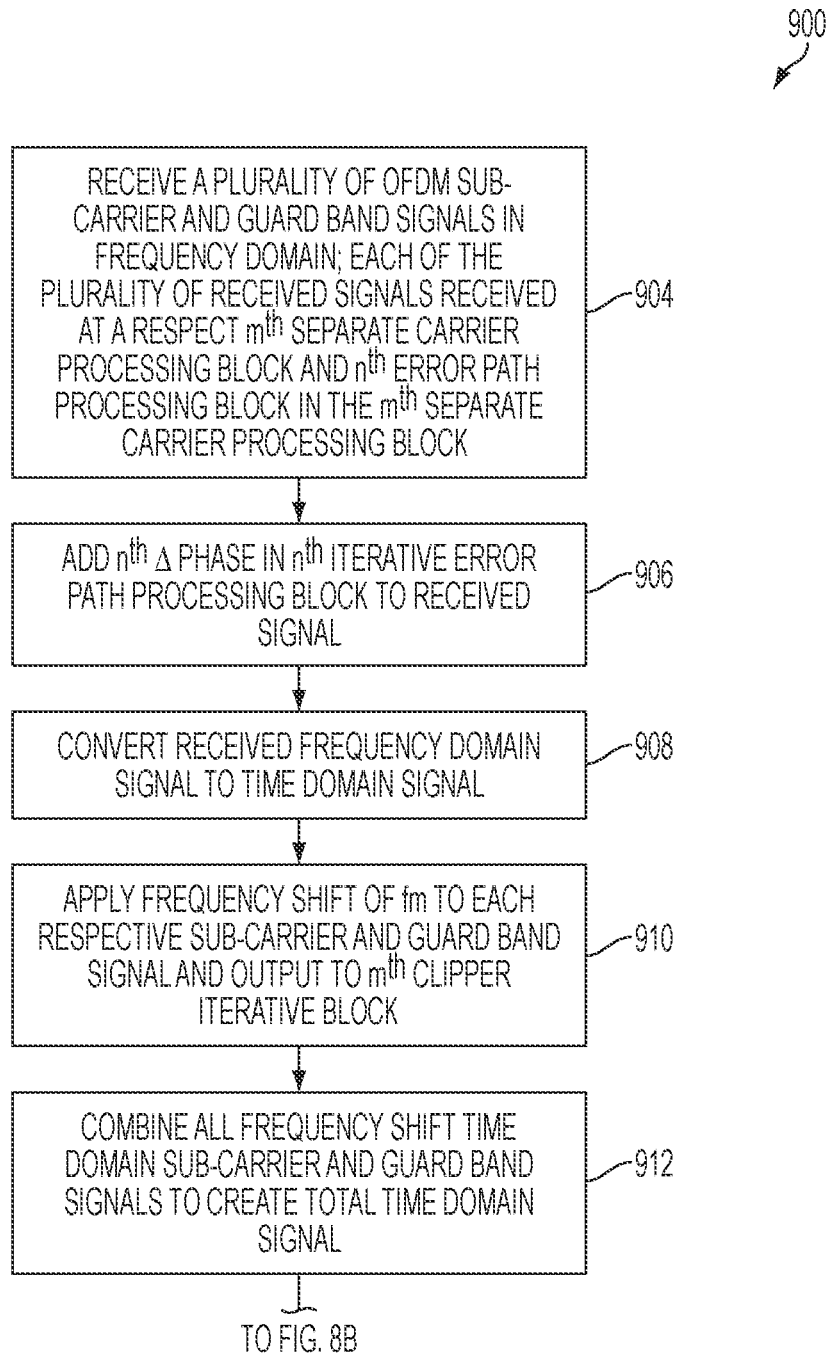
FIG. 8 illustrates a flow diagram of a method of reducing peak power transmissions according to an exemplary embodiment.
Figure 8B:
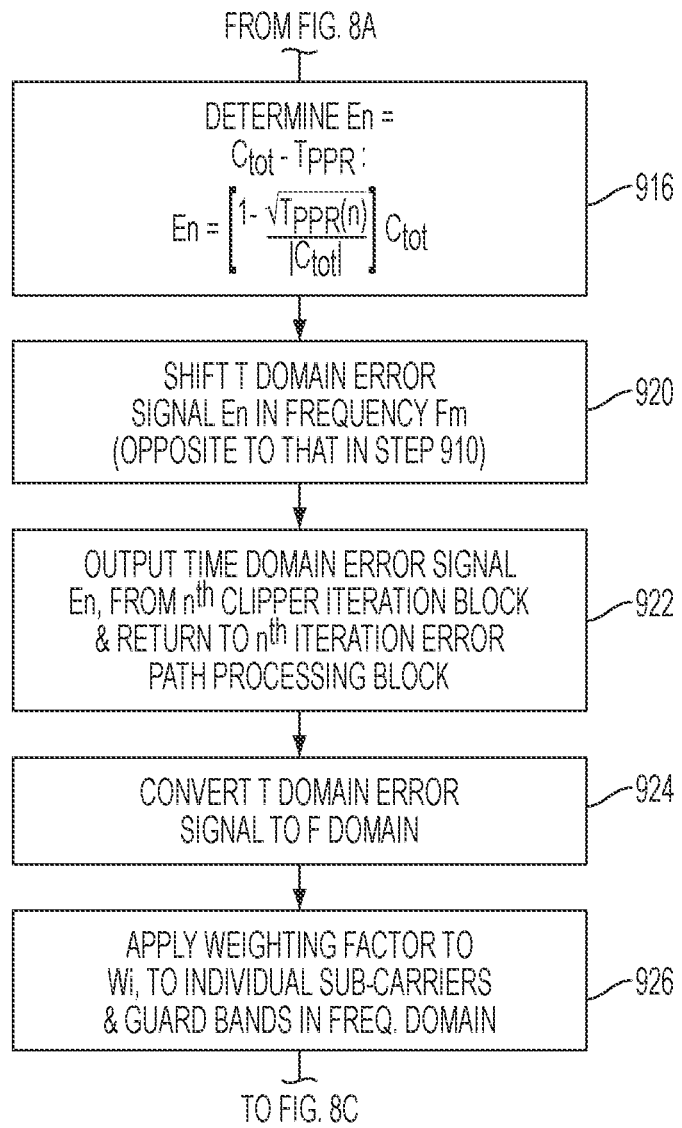
Figure 8C:
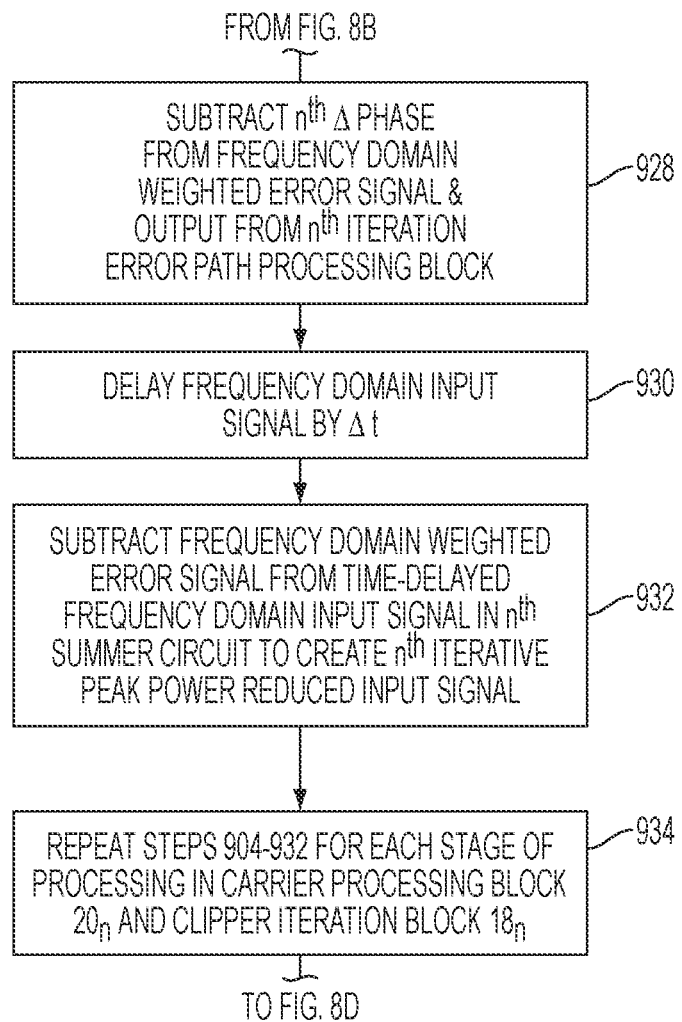
Figure 8D:
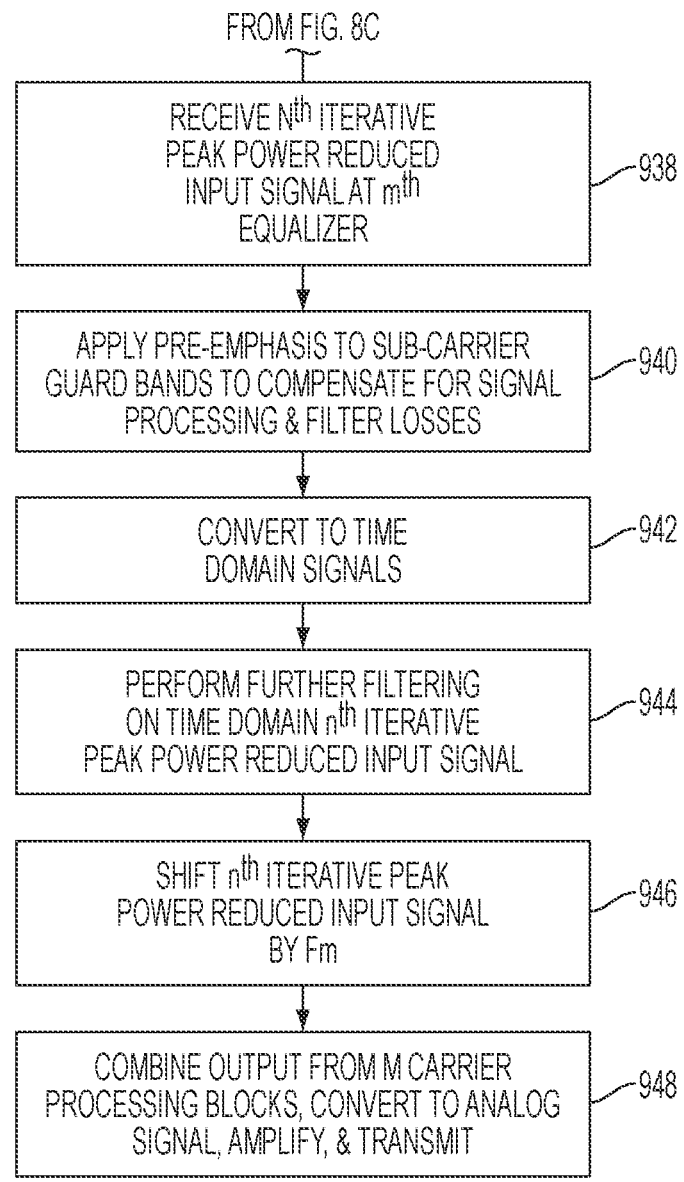

Steps 904 through 910 occur for each of the M carrier processing blocks 20, in iteration processing blocks 8, substantially simultaneously, and in step 912, all of the frequency shifted time domain signals output from the iteration processing blocks 8 are combined in clipper block 18 and summer circuit 44. Of course, as those of ordinary skill in the art can appreciate, "substantially simultaneously" means something different in the digital domain than in the analog domain. In the analog domain, signals are literally summed together at or very close to the speed of light, as that is as fast as electrical signals progress through circuit runs, the only delay coming from the analog circuitry, which is typically measured, according to the particular technology being used, in picoseconds or nanoseconds. With digital domain signals however, processing times, especially when summing signals that may constitute 16 or 32 bits, and can number in the hundreds, can take more than a few picoseconds or nanoseconds. However, delays associated with summing so many digital signals can be accurately tracked and accounted for, and thus normally do not affect the outcome. Thus, it is not improper to speak of the actions occurring substantially simultaneously. The output of summer circuit 44 is the time domain total signal $C_{tot}$. In step 916, the power of $C_{tot}$ is compared to a peak power threshold value, in clip error circuit 46, and $E_n$ is generated according to equation 3, as shown in FIG. 8B. In step 916, the error signal $E_n$ is determined for each sample of $C_{tot}$ by comparing the power of each sample to the peak threshold. As those of ordinary skill in the art can appreciate, $C_{tot}$ and $E_n$ are an array of data for each OFDM symbol, wherein each array contains, according to an exemplary embodiment, 1024 points. In different embodiments, with different sizes of FFT and iFFT circuits (though the FFT and iFFT need to be the same size), the size of the arrays can be different, for example, 2048 points, or 512 points, among other different sizes. As further discussed below for each stage of iteration n, all 1024 input samples must be processed to get 1024 $C_{tot}$ samples and from which 1024 En samples are determined. Thus, for each iteration n, 1024 samples of $E_n$ are forwarded from clipper block 18 to each error path processing block 4 in iteration processing block 8 in each carrier processing block 20. In step 920 of method 900, which follows step 916, a frequency shift opposite to that of what occurred in step 910 is applied to the error signal $E_n$, in the time domain, so that the carrier error signals are now at their correct baseband frequency when received and processed by each of the carrier processing blocks 20. In step 922, the time domain output signal, from the $n^{th}$ clipper iteration block 18, is returned to all of the nth iteration processing blocks 8, in all M carrier processing blocks 20.

In step 924, the received time domain error signal in the error path processing block 4 of iteration processing block 8 is converted from a time domain signal to a frequency domain signal, and then a weighting factor, is applied to each frequency component to control the amount of clipped energy to fall on the particular sub-carrier, as has been discussed in greater detail above. Following the application of the weighting signal, an equal but opposite amount of phase slope change is added to the frequency domain error signal (if any) that is output from multiplier 34. While steps 904 through 928 are undergoing, the original frequency domain input signal, $S_{nm}$, is also received by delay circuit 2 that is part of iteration processing block 8. The delay imposed by delay circuit 2 is substantially equal to a sum of the processing delays in steps 904-928. The output of delay circuit 2 allows the input signal $S_{nm}$ to be time-wise equal to the output of error path processing block 4, such that when, in step 932, the two signal are added (actually, the output of error path processing block 4 is subtracted from the delayed version of input signal $S_{nm}$), they are matched in time so that a true peak power reduced signal is formed.

The output from iteration processing block 8 is the nth iterative peak power reduced input signal. According to an exemplary embodiment, in some cases, the output signal will not be any different from the input signal, in that $E_n$ is equal to 0. According to an exemplary embodiment, the occurrence of $E_n$ being equal to zero is considered to be a rare, though not impossible event. That being the case, FIG. 8 simply shows that the steps are performed linearly, one after another, but it is to be understood by those of ordinary skill in the art that after 932, which all occur for an iteration, steps 904-932 are repeated as shown in step 934, one time for each iteration, until the final iteration n=N occurs. Even when En is equal to zero, because the probability of such an event being so low, FPPR system 100 according to an exemplary embodiment processes $E_n$ in error path processing blocks 4 even though $E_n$ is equal to zero. According to an alternative exemplary embodiment, FPPR system 100 can bypass processing within error path processing blocks 4 when $E_n$ is equal to zero. According to exemplary embodiments, the omission of processing can be achieved by hardware, software, or a combination of both hardware and software. According to a still further exemplary embodiment, it has been determined that when $E_n$ is found to be zero in any one stage, the following stages have $E_n$ equal to zero as well. In the next iterative processing stage, i.e., in the "n+1th" iteration processing block 8, the phase slope increment changed, to search for a peak in a different location on the input signal, and the process continually repeats itself, until all n processing stages have been completed.

In step 938, equalizer 10 receives the output from the last iteration processing block 8, and in step 940, will apply a pre-emphasis to the guard-band sub-carriers used for peak to average power reduction to compensate for attenuation in different filters and other signal processing so that the error signal has a flat frequency transfer function. In step 942, the frequency domain signals are converted to time domain signals in an inverse FFT (iFFT circuit 12), and then filtered in channel filter 14 (step 944). In step 946 the time domain output signal is frequency shifted one additional time as part of the standard signal processing, and then all of the outputs of all carrier processing blocks 20 are summed together in carrier adder 22. This combined digital signal is then converted to an analog signal, and transmitted (steps 946 and 948).

According to still a further exemplary embodiment, FIG. 4 shows a third example of error path processing block 4", as has been described in greater detail above. If error path processing block 4" is used in place of either first and second error path processing blocks 4 and 4', then several steps of method 900 are omitted, and several new steps occur instead. Accordingly, following step 908, conversion of received frequency domain signal to time domain signals, which occurs in FFT circuit 26, a new step is performed to obtain the magnitude of the time domain signal. The magnitude of the time domain version of the received input signal is then output from error path processing block 4" and step 912 of method 900 occurs, omitting step 910. At substantially the same time, the output from iFFT circuit 26 is also processed by phase angle determination circuit 42. Thus, method 900 also includes another step following step 908 of determining the phase angle of the time domain representation of the received input signal. Following processing of the outputs of all of the error path processing blocks 4" in clipper block 18 (which occurs in steps 912 and 916) and the receiving of the error signal $E_n$ in step 922, a new step occurs in method 900. The new step in method 900 occurs prior to step 924, wherein the received error signal $E_n$ is multiplied in multiplier circuit 34a by the phase angle determined by phase angle determination circuit 42, in order to incorporate the phase information of the two carrier signals into the error signal. Method 900 then proceeds as discussed in greater detail above.

FPPR allows for a lower cost, and less complex signal processing apparatus due to the fact that the signal is represented by a smaller number of samples (even below Nyquist) and due to the fact that all signal processing is done in the error path. The fractional delay to achieve the ultra-low sample rate processing can be done with a phase slope in the frequency domain without any additional FFT/iFFTs. For the single carrier case, the carrier can be split into sub-bands to lower even further the sample rate for FPPR.

According to a further exemplary embodiment, FPPR significantly improves the performance of PPR by using some of the otherwise unused spectrum in the guard band which has no impact on system throughput. Still further according to an exemplary embodiment, FPPR provides greater flexibility in choosing to target higher output power transmissions while still meeting already established PAPR and emission requirements when existing EVM requirements are less stringent, and can adapt to EVM requirement variations across the sub-carriers of a carrier and across multiple carriers. FPPR handles multi-carrier PPR efficiently including the handling of large carrier spacing.

Figure 9:
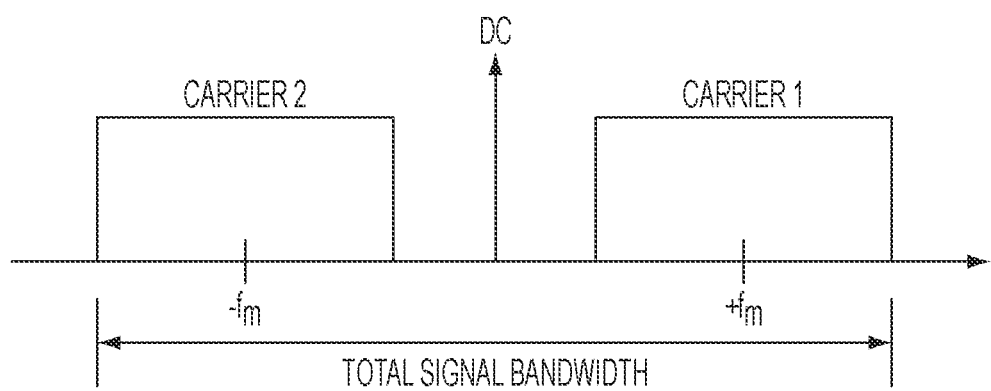
FIG. 9 illustrates the total signal bandwidth for two carriers in an OFDM communications system.

According to an exemplary embodiment, implementation of method 900, discussed in reference to FIG. 9, can occur in a dedicated processor (not shown in any of the FIGS.), or through the various functional blocks shown in FIGS. 1-5. Those of ordinary skill in the art in the field of the invention can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the invention, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during startup, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The present invention can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the present invention pertains.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

We claim:

1. A method for peak power reduction on a plurality of orthogonal frequency divisional multiplexing (OFDM) signals in a communications system, comprising;
    iteratively performing frequency domain processing of at least one OFDM signal carrier to reduce peak power transmissions, wherein said step of iteratively frequency domain processing includes
    receiving a respective one of the plurality of frequency domain OFDM signal carriers by a first of a plurality of iteration processing blocks,
    generating a first time domain error path processing block magnitude signal in the first iteration processing block,
    receiving an $(n-1)^{th}$ iterative frequency domain peak power reduced OFDM carrier signal in each of the remaining n−1 iteration processing blocks, and
    outputting an $n^{th}$ time domain error path processing block magnitude signal from each of the remaining n−1 iteration processing blocks.

2. The method according to claim 1, wherein the at least one OFDM signal carrier includes both in-band sub-carrier signals, and guard-band sub-carrier signals.

3. The method according to claim 1, wherein the step of iteratively performing the frequency domain processing comprises:
    receiving in each new iterative step a frequency domain representation of the output signal from a previous iterative step.

4. The method according to claim 3, wherein each output signal from each iterative step is determined by subtracting an error signal determined for each iterative step, and wherein the error signal when subtracted is in the frequency domain.

5. The method according to claim 1, wherein the step of iteratively performing frequency domain processing comprises:
    receiving each of the plurality of OFDM signals in a separate one of a plurality of carrier processing blocks;
    performing a first error path processing step in each of the separate carrier processing blocks, wherein a determinable phase slope is added to the received input OFDM signal in the frequency domain;
    converting the phase shifted frequency domain input signal to the time domain, wherein due to the added determinable phase slope the plurality of sampling points will be shifted by a first fractional time amount;
    combining a plurality of time shifted input signals in a total signal;
    comparing the power of the total signal to a first peak threshold amount at a respective one of each of the plurality of shifted sampling points, and generating a first error signal equivalent to the amount that the power of the time shifted input signal samples exceeds the first peak threshold amount;
    receiving the first error signal by a second error path processing step in each of the separate carrier processing blocks, and converting the received first error signal to a frequency domain error signal;
    applying respective weighting factors to a first group of frequency components of the first error signal that corresponds to a respective carrier processing block frequency band, whereby excess peak power can be distributed to one or more guard-band sub-carriers of the OFDM signals, and/or one or more of the in-band sub-carriers of the OFDM signals;
    delaying each of the plurality of received input OFDM signals in the frequency domain; and
    subtracting the respective weighted carrier processing block frequency band from the delayed received input OFDM signal to generate a first frequency domain peak power reduced input signal for each carrier processing block, that is then input to a next iteration processing stage of the respective carrier processing blocks, wherein in each of a subsequent one of the iteration stages of each of the plurality of carrier processing blocks, the determinable phase slope changes by a known amount, such that additional peak values of the respective received input OFDM signals can be determined.

6. The method according to claim 5, wherein the number of iteration stages is dependent upon the frequency band of the carrier processing block and the amount of determinable phase slope that is added in each subsequent first error path processing step.

7. The method according to claim 5, wherein an output of each of the respective carrier processing blocks is an output from the last iteration stage, and wherein the method further comprises:
    summing all of the outputs of all of the respective carrier processor blocks into a combined transmission signal;
    converting the transmission signal into an analog signal; and
    transmitting a power amplified version of the transmission signal.

8. The method according to claim 5, further comprising:
    following conversion of the linear phase slope shifted frequency domain input signal into the time domain, wherein the sampling points have been shifted by a first time amount, up-converting the time domain signal by a determinable frequency amount in a numerically controlled oscillator; and
    following receiving of the error signal in the second error path processing step and prior to converting it to a frequency domain signal, down-converting the received error signal by the determinable frequency in a numerically controlled oscillator.

9. The method according to claim 8, further comprising:
    following conversion of the linear phase slope shifted frequency domain input signal into the time domain by an inverse fast Fourier transform circuit with K time domain sampling points, and wherein each of the plurality of sampling points have been shifted by a first time amount, imposing a cyclic rate change of determinable value R in a cyclic rate change circuit, such that there are now R times K time domain sampling points; and
    following receiving of the error signal in the second error path processing step and prior to converting it to a frequency domain signal, performing a reverse cyclic rate change such that there are now K time domain sampling points.

10. The method according to claim 8, wherein each of the plurality of received OFDM input signals is a combined input OFDM signal that includes a plurality of OFDM signals centered about a plurality of separate respective carrier frequencies, and further wherein the respective carrier frequencies are different from one another by a determinable delta carrier frequency, the method further comprising:
    following conversion of the linear phase slope shifted frequency domain input signal into the time domain, determining a time sampled magnitude of the combined input OFDM signal and the signal phase; and following receiving of the error signal in the second error path processing step and prior to converting it to a frequency domain signal, multiplying the received error signal by the signal phase.

11. The method according to claim 5, wherein the weighting factor is determined according to the equation of:

$$Wi = W_i = \frac{\sigma B_T w_i}{\sum_{i=0}^{K-1} B_{w_i}}$$

where $B_T$ is the total bandwidth; $B_{w_i}$ is the spectral density of each weight component $w_i$;

$w_i$ is a weight value that controls the amount of clipped energy that will fall on the frequency component i, K is the size of a Fast Fourier Transform (FFT) process, and σ is a re-growth factor, wherein the re-growth factor controls the overall distortion of the received error signal and is a function of the number of iterations.

12. The method according to claim 5, wherein the weighting factor is determined according to a tolerance for distortion for each sub-carrier signal.

13. The method according to claim 12, wherein the tolerance for distortion is characterized by an error vector magnitude for each sub-carrier signal.

14. The method according to claim 5, further comprising:
increasing a number of time domain samples in each of the received plurality of OFDM signals in a cyclic rate change circuit prior to combining the plurality of time shifted input signals; and
decreasing a number of time domain samples in the received first error signal prior to application of the weighting factors.

15. The method according to claim 5, wherein the plurality of OFDM input signals includes a plurality of sets of OFDM signals, and wherein each of the plurality of sets are based on separate transmission frequencies, the method further comprising:
obtaining a magnitude of each of the plurality of sets of OFDM input signals, wherein the magnitude of each of the plurality of sets of OFDM signals comprises a phasor with a maximum magnitude and a minimum magnitude, and wherein the phasors change between the maximum and minimum magnitudes at a frequency related to the respective transmission frequencies, and further wherein the magnitude of the plurality of sets of OFDM signals is determined prior to the step of time shifting; and
obtaining a plurality of phase differences between each of the plurality of sets of OFDM signals, wherein respective phase differences are multiplied against the received error signal to recover the plurality of frequency differences between each of the plurality of sets of OFDM input signals.

16. The method according to claim 5, wherein the first error signal is determined according to the equation of:

$$E_n = \left[1 - \frac{\sqrt{T_{PPR}(n)}}{|C_{tot}|}\right] C_{tot}.$$

17. A system for peak power reduction on a plurality of orthogonal frequency divisional multiplexing (OFDM) signal carriers in a communications system, comprising:

a plurality of carrier processing blocks configured to iteratively perform frequency domain processing of at least one OFDM signal carrier to reduce peak power transmissions, wherein each of the plurality of carrier processing blocks includes
a plurality of iteration processing blocks, wherein a first iteration processing block is configured to receive a respective one of the plurality of frequency domain OFDM signal carriers, and generate a first time domain error path processing block magnitude signal, receive a first iterative time domain error signal, and output a first iterative frequency domain peak power reduced OFDM carrier signal, and wherein
each of the remaining n−1 iteration processing blocks are configured to receive an $(n-1)^{th}$ iterative frequency domain peak power reduced OFDM carrier signal, output an $n^{th}$ time domain error path processing block magnitude signal, receive an $n^{th}$ iterative error signal, and generate an $n_{th}$ iterative frequency domain peak power reduced OFDM carrier signal.

18. The system according to claim 17, wherein the at least one OFDM signal carrier includes both in-band sub-carrier signals, and guard-band sub-carrier signals.

19. The system according to claim 17, further comprising:
a plurality of OFDM signal processing blocks, there being a respective one of the plurality of OFDM signal processing blocks for each of the respective plurality of carrier processing blocks, and wherein each of the plurality of OFDM signal processing blocks is configured to receive an nth iterative frequency domain peak power reduced OFDM carrier signal and output a time domain, filtered, peak power reduced OFDM carrier signal;
a summer to add each of the plurality of time domain, filtered, peak power reduced OFDM carrier signals; and
a high powered transmitter to transmit the summed time domain, filtered peak power reduced OFDM carrier signal following conversion from a digital time domain signal to an analog signal.

20. The system according to claim 19, wherein each of the plurality of OFDM signal processing blocks comprises:
an equalizer configured to boost in amplitude sub-carrier guard band signals within the nth iterative frequency domain peak power reduced input signal;
an inverse fast frequency transform circuit configured to convert the equalized nth iterative frequency domain peak power reduced input signal to an equalized nth iterative time domain peak power reduced input signal; and
a filter configured to substantially reduce or eliminate unwanted frequency components from the equalized nth iterative time domain peak power reduced input signal to output time domain, filtered, peak power reduced OFDM signals.

21. The system according to claim 17, wherein the number of iteration stages is dependent upon the frequency band of the carrier processing block and the amount of determinable phase slope that is added in each subsequent first error path processing step.

22. The system according to claim 17, wherein each of the plurality of carrier processing blocks comprises:
a plurality of error path processing blocks, and wherein each of the plurality of error path processing blocks include—
a phase slope circuit configured to add a determinable phase slope to the received input OFDM signal carrier in the frequency domain;

an inverse fast frequency transform circuit configured to convert the phase shifted frequency domain input OFDM signal carrier to the time domain, wherein due to the added determinable phase slope, a plurality of sampling points will be shifted by a first fractional time amount; and a first numerically controlled oscillator configured to shift the time domain received frequency domain OFDM signal carrier by a first predetermined frequency amount based on which of the plurality of carrier processing blocks the received input OFDM carrier signals are received in, and outputting an iterative time domain error path processing block magnitude signal.

23. The system according to claim 22, wherein for each iteration of processing, the fractional time amount shift causes additional peak values of the iterative time domain error path processing block magnitude signal to be output by the error path processing block.

24. The system according to claim 22, further comprising:
a combiner configured to combine a plurality of $n^{th}$ iterative time domain error path processing block magnitude signals to generate an nth iterative total combined magnitude signal $C_{tot}$; and
a clip error circuit configured to compare the nth iterative total combined magnitude signal to a peak power threshold signal $T_{PPR}$ and generate an $n^{th}$ iterative error signal $E_n$ on a symbol-by-symbol basis, wherein the nth iterative error signal either has a zero value when the nth iterative total combined magnitude signal is less than the peak power threshold signal, and further wherein the nth iterative error signal has a non-zero value when the nth iterative total combined magnitude signal is greater than the peak power threshold signal.

25. The system according to claim 24, wherein the non-zero value of the nth iterative error signal is equal to the amount that the nth iterative total combined magnitude signal exceeds the peak power threshold signal.

26. The system according to claim 24, wherein the nth iterative error signal is determined according to the equation of:

$$E_n = \left[1 - \frac{\sqrt{T_{PPR}(n)}}{|C_{tot}|}\right] C_{tot}.$$

27. The system according to claim 24, wherein the clip error circuit is further configured to, on an iterative basis, compare the nth iterative total combined magnitude signal to a first peak threshold amount at a respective one of each of the plurality of shifted sampling points to generate an nth iterative error signal.

28. The system according to claim 24, wherein the error path processing block (4) further comprises:
a second numerically controlled oscillator configured to receive the nth iterative error signal and shift it by a second predetermined frequency amount substantially equivalent to an inverse of the first predetermined frequency amount;
a fast Fourier transform circuit configured to convert the frequency shifted nth iterative error signal to a frequency domain iterative error signal;
a multiplier circuit configured to multiply the frequency domain iterative error signal by a plurality of weighting factors to generate an iterative weighted error signal; and
an inverse phase slope circuit configured to subtract a second determinable phase slope substantially equal to in magnitude to the first determinable phase slope from the iterative weighted error signal.

29. The system according to claim 28, further comprising:
a plurality of delay circuits, one for each of the plurality of carrier processing blocks, configured to receive a respective one of the plurality of OFDM signal carriers and delay it by a first delta time; and
a plurality of multiplier circuits, one for each of the plurality of carrier processing blocks, configured to multiply the delayed OFDM signal carrier and the weighted iterative error signal to generate the nth iterative frequency domain peak power reduced OFDM carrier, whereby excess peak power can be distributed to one or more guard-band sub-carriers of the OFDM signal carrier, and/or one or more in-band sub-carriers of the OFDM signal carrier.

30. The system according to claim 29, wherein the first delta time is substantially equivalent to a sum of the processing time in positive phase slope circuit, inverse fast Fourier transform circuit (26), first numerically controlled oscillator, combiner, clip error circuit, second numerically controlled oscillator, fast Fourier transform circuit, multiplier, and negative phase slope circuit.

31. The system according to claim 29, wherein the nth iterative frequency domain peak power reduced OFDM carrier is input to an (n+1)th error path processing block, and an n=Nth iterative frequency domain peak power reduction OFDM carrier is generated.

32. The system according to claim 29, further comprising:
a plurality of OFDM carrier signal processing blocks, one for each of the carrier processing blocks, configured to process respective ones of the Nth iterative frequency domain peak power reduced OFDM carrier signals and generate time domain peak power reduced OFDM carrier signals;
a summer to sum the plurality of time domain peak power reduced OFDM carrier signals into a combined digital transmission signal;
converting the transmission signal into an analog signal; and
transmitting a power amplified version of the transmission signal.

33. The system according to claim 28, further comprising:
a cyclic rate change increase circuit after the inverse fast Fourier transform circuit and before first numerically controlled oscillator, wherein the cyclic rate change increase circuit comprises a pre-determined cyclic rate change value R and is configured to generate M time domain sampling points, wherein M equals R times K, wherein K corresponds to the number of sample points of the time domain received frequency domain OFDM signal carrier; and
a cyclic rate change reduction circuit after the second numerically controlled oscillator circuit, and before the fast Fourier transform circuit, wherein the cyclic rate change reduction circuit comprises the pre-determined cyclic rate change value R and is configured to generate M divided by R time domain sampling points, such that there are again K time domain sample points to be processed by the fast Fourier transform circuit.

34. The system according to claim 28, wherein each of the plurality of received OFDM signal carriers is a combined input OFDM signal that includes a plurality of OFDM signals centered about a plurality of separate respective carrier frequencies, and further wherein the respective carrier frequencies are different from one another by a determinable delta carrier frequency, the system further comprising:

a magnitude determination circuit after the inverse fast Fourier transform circuit, wherein the magnitude determination circuit is configured to determine a time sampled magnitude of the combined input OFDM signal;

a signal phase determination circuit after the inverse fast Fourier transform circuit, wherein the signal phase determination circuit is configured to determine a plurality of phase differences between the signals that comprise the combined input OFDM signal; and a multiplier circuit configured to multiply the received $n^{th}$ iterative error signal by the phase difference generated by the signal phase determination circuit prior to conversion by the fast Fourier transform circuit, and further wherein the first and second numerically controlled oscillators have been omitted.

35. The system according to claim 34, wherein the time sampled magnitude of the combined input OFDM signal comprises a phasor with a maximum magnitude and a minimum magnitude, and wherein the phasor changes between the maximum and minimum magnitudes at a frequency related to the respective transmission frequencies, and further wherein the plurality of phase differences are multiplied against the received $n^{th}$ iterative error signal to recover the plurality of frequency differences between each of the plurality of received OFDM signal carriers.

36. The system according to claim 28, wherein the weighting factor is determined according to the equation of:

$$Wi = W_i = \frac{\sigma B_T w_i}{\sum_{i=0}^{K-1} B_{w_i}}$$

where $B_T$ is the total bandwidth; $B_{w_i}$ is the spectral density of each weight component $w_i$;

$w_i$ is a weight value that controls the amount of clipped energy that will fall on the frequency component i, K is the size of a Fast Fourier Transform (FFT) process, and $\sigma$ is a re-growth factor, wherein the re-growth factor controls the overall distortion of the received error signal and is a function of the number of iterations.

37. The system according to claim 36, wherein the weighting factor is determined according to a tolerance for distortion for each sub-carrier signal.

38. The method according to claim 37, wherein the tolerance for distortion is characterized by an error vector magnitude for each sub-carrier signal.

* * * * *